(12) United States Patent
Li et al.

(10) Patent No.: US 10,859,796 B2
(45) Date of Patent: Dec. 8, 2020

(54) OPTICAL IMAGING LENS ASSEMBLY

(71) Applicant: ZHEJIANG SUNNY OPTICAL CO., LTD., Ningbo (CN)

(72) Inventors: Ming Li, Ningbo (CN); Jian Yang, Ningbo (CN); Lingbo He, Ningbo (CN)

(73) Assignee: Zhejiang Sunny Optical Co., Ltd.

( * ) Notice: Subject to any disclaimer, the term of this patent is extended or adjusted under 35 U.S.C. 154(b) by 127 days.

(21) Appl. No.: 16/226,181

(22) Filed: Dec. 19, 2018

(65) Prior Publication Data

US 2019/0121063 A1 Apr. 25, 2019

Related U.S. Application Data

(63) Continuation of application No. PCT/CN2018/077203, filed on Feb. 26, 2018.

(30) Foreign Application Priority Data

Jul. 31, 2017 (CN) .......................... 2017 1 0640672
Jul. 31, 2017 (CN) ..................... 2017 2 0942056 U

(51) Int. Cl.
*G02B 9/62* (2006.01)
*G02B 13/18* (2006.01)
(Continued)

(52) U.S. Cl.
CPC .................. *G02B 9/62* (2013.01); *G02B 7/04* (2013.01); *G02B 13/0045* (2013.01); *G02B 27/0025* (2013.01)

(58) Field of Classification Search
CPC ........ G02B 9/62; G02B 7/04; G02B 13/0045; G02B 27/0025
(Continued)

(56) References Cited

U.S. PATENT DOCUMENTS

2012/0194726 A1  8/2012  Huang et al.
2013/0070346 A1  3/2013  Hsu et al.
(Continued)

FOREIGN PATENT DOCUMENTS

CN    202522758 U    11/2012
CN    104122650 B     9/2016
(Continued)

OTHER PUBLICATIONS

PCT International Search Report completed by the ISA/CN dated May 21, 2018 and issued in connection with PCT/CN2018/077203, 6 pages.

*Primary Examiner* — William Choi
(74) *Attorney, Agent, or Firm* — Barnes & Thornburg LLP

(57) ABSTRACT

The present disclosure discloses an optical imaging lens assembly. The optical imaging lens assembly includes, sequentially along an optical axis from an object side to an image side, a first lens, a second lens, a third lens, a fourth lens, a fifth lens, and a sixth lens. The first lens has a positive refractive power, and each of the second lens, the third lens, and the sixth lens has a negative refractive power. At least one of the fourth lens or the fifth lens has a positive refractive power. The object-side surface of the first lens and the image-side surface of the fourth lens are convex surfaces. The image-side surface of the second lens and the image-side surface of the sixth lens are concave surfaces. A total effective focal length f of the optical imaging lens assembly and a radius of curvature R9 of an object-side surface of the fifth lens satisfy: f/|R9|≤0.35.

18 Claims, 14 Drawing Sheets

(51) Int. Cl.
    *G02B 7/04*     (2006.01)
    *G02B 27/00*     (2006.01)
    *G02B 13/00*     (2006.01)

(58) Field of Classification Search
    USPC ................................ 359/713, 752, 756, 757
    See application file for complete search history.

(56) References Cited

U.S. PATENT DOCUMENTS

| | | |
|---|---|---|
| 2014/0063618 A1 | 3/2014 | Park et al. |
| 2014/0320981 A1 | 10/2014 | Hsieh et al. |
| 2015/0109692 A1 | 4/2015 | Son |
| 2016/0216485 A1 | 7/2016 | Chen et al. |
| 2016/0313536 A1* | 10/2016 | Kubota .................... G02B 9/62 |

FOREIGN PATENT DOCUMENTS

| | | |
|---|---|---|
| CN | 106990511 A | 7/2017 |
| CN | 107219613 A | 9/2017 |
| CN | 206930826 U | 1/2018 |
| WO | 2015005417 A1 | 1/2015 |

\* cited by examiner

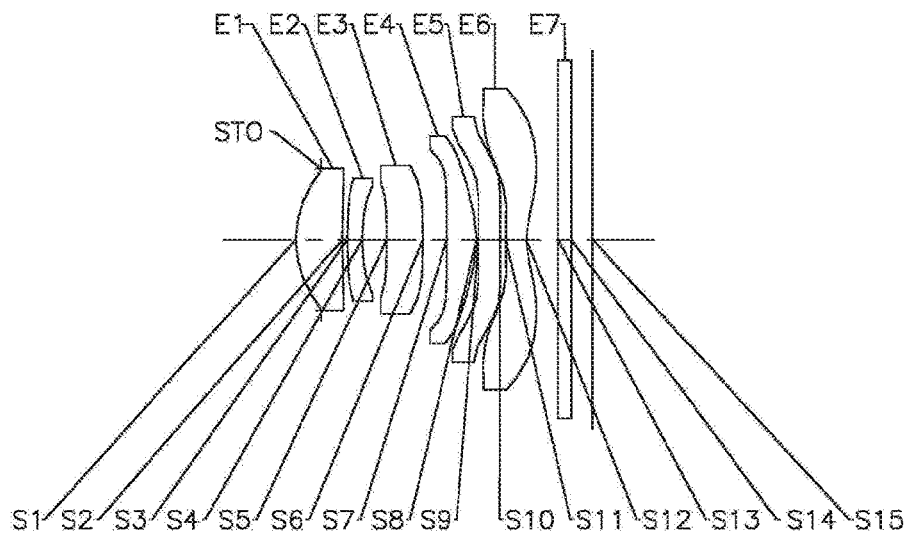
Fig. 1
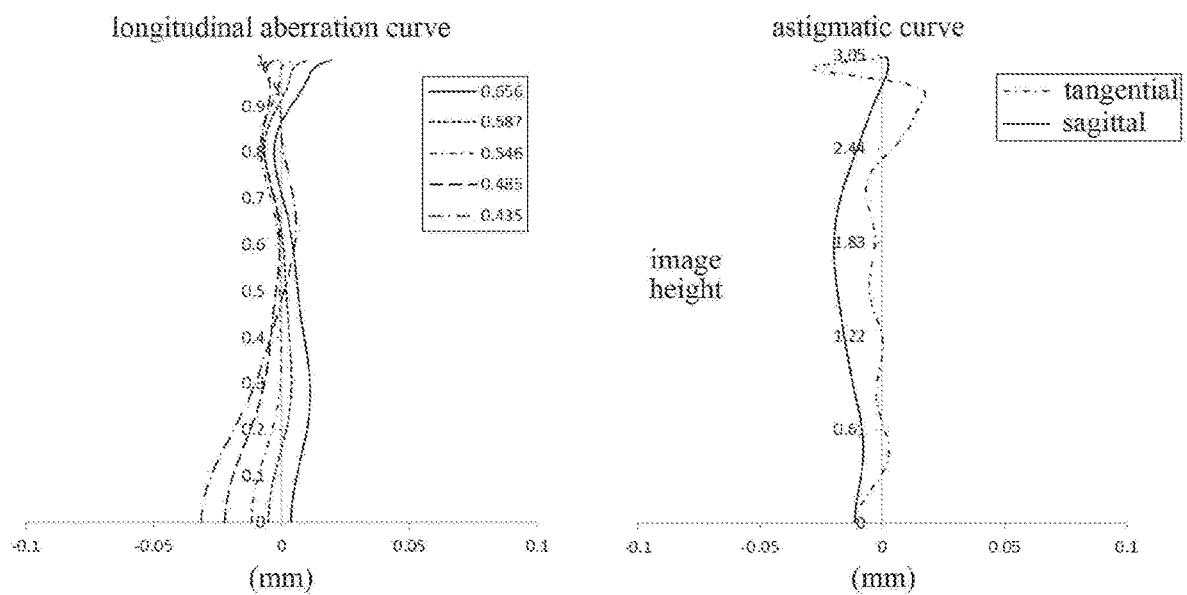
Fig. 2A
Fig. 2B

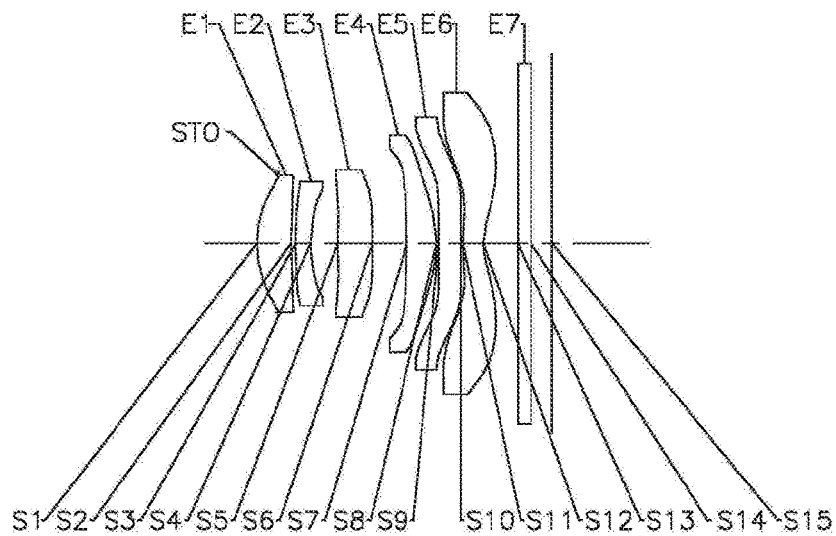
Fig. 17
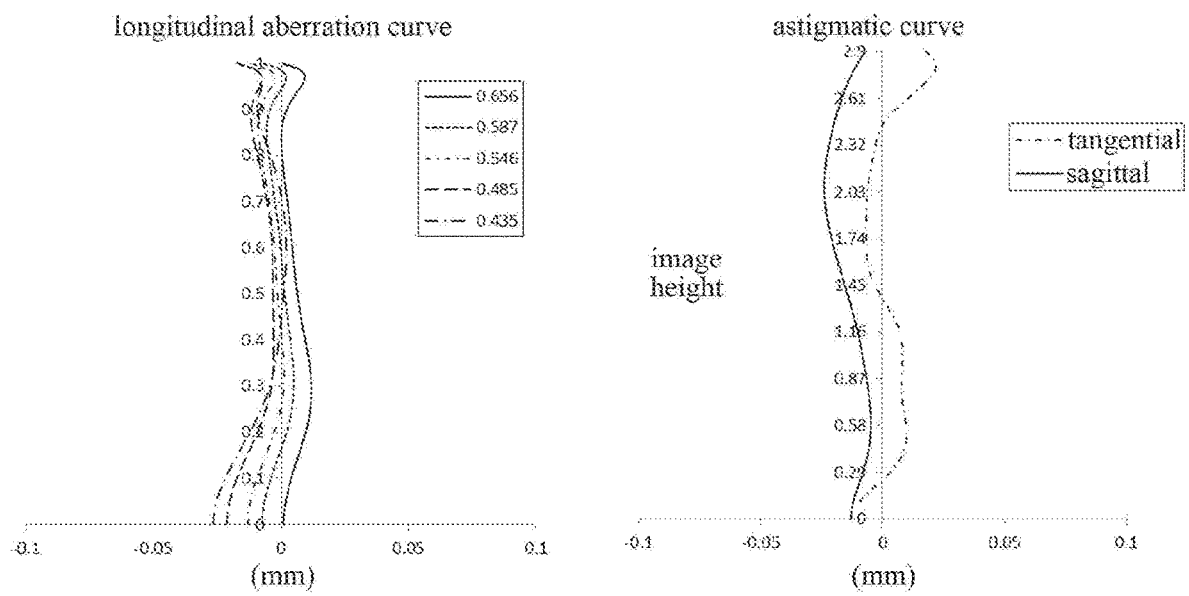
Fig. 18A
Fig. 18B

OPTICAL IMAGING LENS ASSEMBLY

CROSS-REFERENCE TO RELATED APPLICATIONS

This application is a continuation of International Application No. PCT/CN2018/077203, filed on Feb. 26, 2018, claims the priorities and rights to Chinese Patent Application No. 201710640672.2 and Chinese Patent Application No. 201720942056.8 filed with the China National Intellectual Property Administration (CNIPA) on Jul. 31, 2017. All of the aforementioned applications are hereby incorporated by reference in their entireties.

TECHNICAL FIELD

The present disclosure relates to an optical imaging lens assembly, and more specifically to an optical imaging lens assembly including six lenses.

BACKGROUND

In recent years, as science and technology develop, portable electronic products are gradually emerging, and portable electronic products having camera functions are increasingly favored by the consumers. Therefore, there is an increasing demand for camera lens assemblies suitable for the portable electronic products. Since the portable electronic products tend to be miniaturised, a total length of a lens assembly is limited, thereby increasing the difficulty in designing the lens assembly.

Meanwhile, with the performance improvement and size reduction of the commonly used photosensitive elements such as charge-coupled device elements (CCD) or complementary metal-oxide semiconductor elements (CMOS), the number of pixels is increased and the size of the pixels is reduced. Accordingly, higher requirements on high imaging quality and miniaturization of the counterpart optical imaging lens assemblies have been brought forward.

A typical configuration of an existing lens assembly has an F-number Fno (total effective focal length of the lens assembly/entrance pupil diameter of the lens assembly) of 2.0 or above. Although this type of lens assembly can satisfy the miniaturization requirement, in situations such as insufficient lighting (e.g., cloudy and rainy days, or at dusk) or hand trembling, the imaging quality of the lens assembly cannot be ensured. Therefore, the lens assembly having the F-number Fno of 2.0 or above has been unable to meet the higher imaging requirements.

SUMMARY

The present disclosure provides an optical imaging lens assembly which may be applicable to portable electronic products and may at least or partially solve at least one of the above disadvantages in the existing technology.

According to an aspect, the present disclosure provides an optical imaging lens assembly. The optical imaging lens assembly includes, sequentially along an optical axis from an object side to an image side a first lens, a second lens, a third lens, a fourth lens, a fifth lens, and a sixth lens. The first lens may have a positive refractive power. Each of the second lens, the third lens, and the sixth lens may have a negative refractive power. At least one of the fourth lens or the fifth lens may have a positive refractive power. An object-side surface of the first lens and an image-side surface of the fourth lens may both be convex surfaces. An image-side surface of the second lens and an image-side surface of the sixth lens may both be concave surfaces. A total effective focal length f of the optical imaging lens assembly and a radius of curvature R9 of an object-side surface of the fifth lens may satisfy: $f/|R9|\le 0.35$.

In an implementation, the total effective focal length f of the optical imaging lens assembly and an entrance pupil diameter EPD of the optical imaging lens assembly may satisfy: $f/EPD \le 1.8$.

In an implementation, an effective focal length f1 of the first lens and an effective focal length f2 of the second lens may satisfy: $-1 < f1/f2 < 0$.

In an implementation, the total effective focal length f of the optical imaging lens assembly and the effective focal length f1 of the first lens may satisfy: $1 < f/f1 < 1.5$.

In an implementation, a center thickness CT1 of the first lens on the optical axis and a center thickness CT2 of the second lens on the optical axis, may satisfy: $2.0 < CT1/CT2 < 3.5$.

In an implementation, the total effective focal length f of the optical imaging lens assembly and a radius of curvature R12 of the image-side surface of the sixth lens may satisfy: $2.5 < f/R12 < 4.0$.

In an implementation, the total effective focal length f of the optical imaging lens assembly and a radius of curvature R1 of the object side surface of the first lens may satisfy: $2 \le f/R1 < 2.5$.

In an implementation, the fourth lens may have a positive refractive power. An effective focal length f4 of the fourth lens and the total effective focal length f of the optical imaging lens assembly may satisfy: $0.7 < f4/f < 1.2$.

In an implementation, an abbe number V1 of the first lens and an abbe number V2 of the second lens may satisfy: $2.0 < V1/V2 < 4.0$.

In an implementation, an incident angle β62 of an upper ray of a maximal field of view entering on the image-side surface of the sixth lens may satisfy: $7° < \beta 62 < 12°$.

In an implementation, a distance TTL on the optical axis from a center of the object-side surface of the first lens to an image plane of the optical imaging lens assembly and half of a diagonal length ImgH of an effective pixel area on the image plane of the optical imaging lens assembly may satisfy: $TTL/ImgH \le 1.7$.

According to another aspect, the present disclosure provides an optical imaging lens assembly. The optical imaging lens assembly includes, sequentially along an optical axis from an object side to an image side, a first lens, a second lens, a third lens, a fourth lens, a fifth lens, and a sixth lens. The first lens may have a positive refractive power, and an object-side surface of the first lens may be a convex surface. The second lens may have a negative refractive power, and an image-side surface of the second lens may be a concave surface. The third lens has a positive refractive power or a negative refractive power. The fourth lens may have a positive refractive power, and an image-side surface of the fourth lens may be a convex surface. The fifth lens has a positive refractive power or a negative refractive power, an object-side surface of the fifth lens may be a concave surface, and an image-side surface of the fifth lens may be a convex surface. The sixth lens may have a negative refractive power, and an image-side surface of the sixth lens may be a concave surface. A total effective focal length f of the optical imaging lens assembly and a radius of curvature R10 of the image-side surface of the fifth lens may satisfy: $f/|R10| \le 10.5$.

In an implementation, the total effective focal length f of the optical imaging lens assembly and an effective focal length f1 of the first lens may satisfy: 1<f/f1<1.5.

In an implementation, an effective focal length f4 of the fourth lens and the total effective focal length f of the optical imaging lens assembly may satisfy: 0.7<f4/f<1.2.

In an implementation, the effective focal length f1 of the first lens and an effective focal length f2 of the second lens may satisfy: −1<f1/f2<0.

In an implementation, an abbe number V1 of the first lens and an abbe number V2 of the second lens may satisfy: 2.0<V1/V2<4.0.

In an implementation, a center thickness CT1 of the first lens on the optical axis and a center thickness CT2 of the second lens on the optical axis may satisfy: 2.0<CT1/CT2<3.5.

In an implementation, the total effective focal length f of the optical imaging lens assembly and a radius of curvature R1 of the object-side surface of the first lens may satisfy: 2≤f/R1<2.5.

In an implementation, the total effective focal length f of the optical imaging lens assembly and a radius of curvature R12 of the image-side surface of the sixth lens may satisfy: 2.5<f/R12<4.0.

In an implementation, an incident angle β62 of an upper ray of a maximal field of view entering on the image-side surface of the sixth lens may satisfy: 7°<β62<12°

In an implementation, a distance TTL on the optical axis from a center of the object-side surface of the first lens to an image plane of the optical imaging lens assembly and half of a diagonal length ImgH of an effective pixel area on the image plane of the optical imaging lens assembly may satisfy: TTL/ImgH≤1.7.

In an implementation, the total effective focal length f of the optical imaging lens assembly and an entrance pupil diameter EPD of the optical imaging lens assembly may satisfy: f/EPD≤1.8.

According to another aspect, the present disclosure further provides an optical imaging lens assembly. The optical imaging lens assembly includes, sequentially along an optical axis from an object side to an image side, a first lens, a second lens, a third lens, a fourth lens, a fifth lens, and a sixth lens. The first lens may have a positive refractive power, and an object-side surface of the first lens may be a convex surface. The second lens may have a negative refractive power, and an image-side surface of the second lens may be a concave surface. The third lens has a positive refractive power or a negative refractive power. The fourth lens has a positive refractive power or a negative refractive power, and an image-side surface of the fourth lens may be a convex surface. The fifth lens has a positive refractive power or a negative refractive power. The sixth lens may have a negative refractive power, and an image-side surface of the sixth lens may be a concave surface. An incident angle β62 of an upper ray of a maximal field of view entering on the image-side surface of the sixth lens may satisfy: 7°<β62<12°.

The present disclose adopts, for example, six lenses. By reasonably distributing the refractive powers and the surface types of the lenses, the center thicknesses of the lenses, and the spacing distances on the axis between the lenses, etc., the system has a large-aperture advantage in the process of increasing the amount of light admitted, thereby enhancing the imaging effect in a dark environment while improving edge ray aberrations. Meanwhile, the optical imaging lens assembly with the above configuration may have at least one of the beneficial effects of miniaturization, large-aperture, high image quality, or low sensitivity.

BRIEF DESCRIPTION OF THE DRAWINGS

By describing non-limiting implementations below in detail with reference to the accompanying drawings, other features, objectives and advantages of the present disclosure will be more apparent. In the accompanying drawings:

FIG. 1 is a schematic structural diagram illustrating an optical imaging lens assembly according to Embodiment 1 of the present disclosure;

FIGS. 2A-2D respectively illustrate a longitudinal aberration curve, an astigmatic curve, a distortion curve, and a lateral color curve of the optical imaging lens assembly according to Embodiment 1;

FIG. 17 is a schematic structural diagram. Illustrative an optical imaging lens assembly according to Embodiment 9 of the present disclosure;

FIGS. 18A-18D respectively illustrate a longitudinal aberration curve, an astigmatic curve, a distortion curve, and a lateral color curve of the optical imaging lens assembly according to Embodiment 9.

DETAILED DESCRIPTION

Figure 2C:
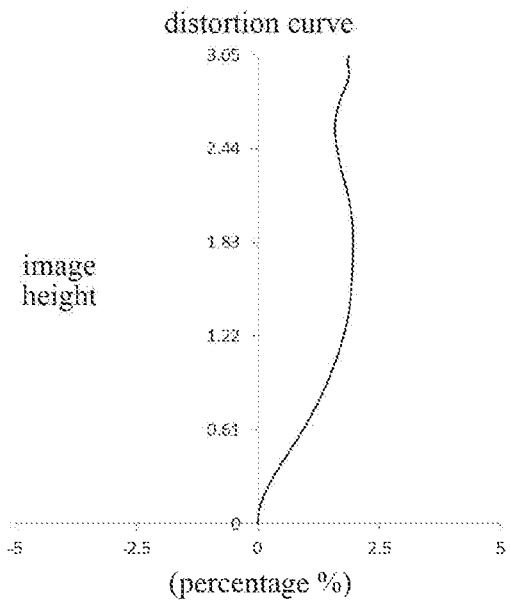

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least an the paraxial area; and if a surface of a lens is a concave surface and a position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

The optical imaging lens assembly according to exemplary implementations of the present disclosure includes, for example, six lenses (i.e., a first lens, a second lens, a third lens, a fourth lens, a fifth lens, and a sixth lens) having refractive powers. The optical imaging lens assembly may further include a photosensitive element disposed on the image plane.

The first lens may have a positive refractive power, and an object-side surface of the first lens may be a convex surface. The second lens may have a negative refractive power, and an image-side surface of the second lens may be a concave surface. The third lens has a positive refractive power or a negative refractive power. The fourth lens has a positive refractive power or a negative refractive power, and an image-side surface of the fourth lens is a convex surface. The fifth lens has a positive refractive power or a negative refractive power. The sixth lens has a negative refractive power, and an image-side surface of the sixth lens is a concave surface.

In an implementation, the third lens may have a negative refractive power. When the third lens has a negative refractive power, it is conductive to reducing a sensitivity of a system.

In an implementation, an object-side surface of the fifth lens may be a concave surface, and an image-side surface of the fifth lens may be a convex surface. Setting the fifth lens as a meniscus shape convex toward the image side helps to reduce the amount of astigmatism of the system and match a chief ray angle CRA of a chip.

A total effective focal length f of the optical imaging lens assembly and an effective focal length f1 of the first lens may satisfy: $1<f/f1<1.5$, and more specifically, f and f1 may further satisfy: $1.05 \le f/f1 \le 1.34$. By reasonably distributing the refractive power of the first lens, the imaging lens assembly may have a good ability to balance the field curvature.

An effective focal length f4 of the fourth lens and the total effective focal length f of the optical imaging lens assembly may satisfy: $0.7<f4/f<1.2$, and more specifically, f4 and f may further satisfy: $0.84 \le f4/f \le 1.04$. By reasonably distributing the refractive power of the fourth lens, the imaging lens assembly may have a good ability to balance the astigmatism.

The effective focal length f1 of the first lens and an effective focal length f2 of the second lens may satisfy: $-1<f1/f2<0$, and more specifically, f1 and f2 may further satisfy: $-0.57 \le f1/f2 \le -0.32$. By reasonably distributing the refractive powers of the first lens and the second lens, a light deflection angle may be decreased and the sensitivity or the system may be reduced.

A center thickness CT1 of the first lens on the optical axis and a center thickness CT2 of the second lens on the optical axis may satisfy: $2.0<CT1/CT2<3.5$, and more specifically, CT1 and CT2 may further satisfy: 2.27≤CT1/CT2≤3.41. By reasonably setting the center thicknesses of the first lens and the second lens, the lens assembly may have a good ability to balance aberrations.

The total effective focal length f of the optical imaging lens assembly and a radius of curvature R1 of the object-side surface of the first lens may satisfy: 2≤f/R1<2.5, and more specifically, f and R1 may further satisfy: 2.03≤f/R1≤2.34. By reasonably setting the radius of curvature of the object-side surface of the first lens, the aberrations of the system may be effectively balanced and the imaging quality of the lens assembly may be effectively improved.

The total effective focal length f of the optical imaging lens assembly and a radius of curvature R9 of the object-side surface of the fifth lens may satisfy: f/|R9|≤0.35, and more specifically, f and R9 may further satisfy: 0≤f/|R9|≤0.27. The total effective focal length f of the optical imaging lens assembly and a radius of curvature R10 of the image-side surface of the fifth lens may satisfy: f/|R10|≤0.5, and more specifically, f and R10 may further satisfy: 0.08≤f/|R10|≤0.42.

The total effective focal length f of the optical imaging lens assembly and a radius of curvature R12 of the image-side of the sixth lens may satisfy: 2.5<f/R12<4.0, and more specifically, f and R12 may further satisfy: 2.93≤f/R12≤3.79. By reasonably setting the radius of curvature of the sixth lens, the lens assembly can be well matched with the commonly used chips.

Figure 19:
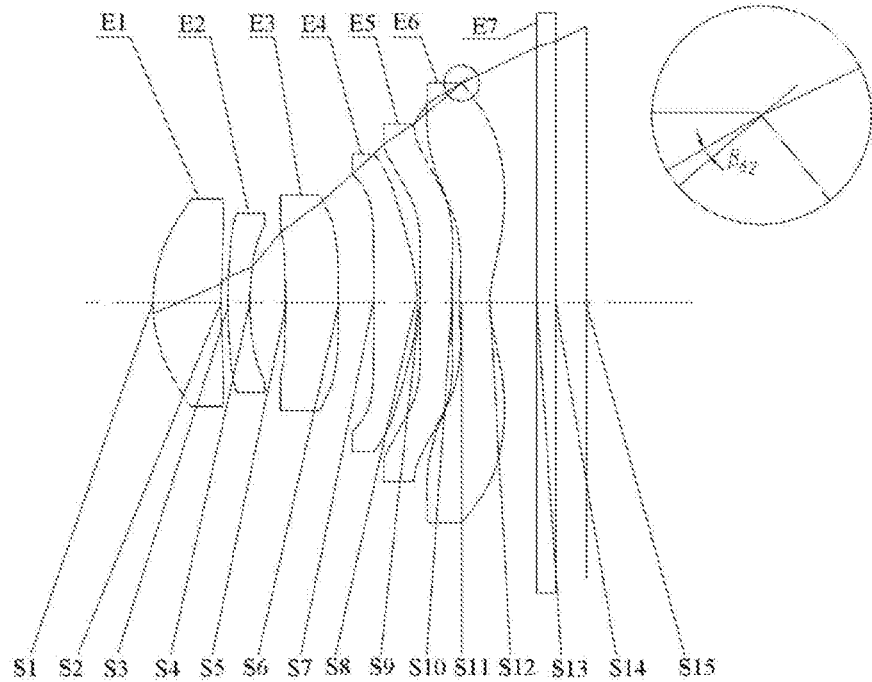
FIG. 19 schematically illustrates an incident angle β62 of an upper ray of a maximal field of view entering on an image-side surface of a sixth lens.

An incident angle β62 (shown in FIG. 19) of an upper ray of a maximal of view entering on the image-side surface of the sixth lens may satisfy: 7°<β62<12°, and more specifically, β62 may further satisfy: 8.3°≤β62≤11°. By controlling β62 within a reasonable range, a ghost image state of the system may be effectively diminished to a range acceptable.

An abbe number V1 of the first lens and an abbe number V2 of the second lens may satisfy: 2.0<V1/V2<4.0, and more specifically, V1 and V2 may further satisfy: 2.23≤V1/V2≤3.14. By reasonably selecting the materials of the first lens and the second lens, the imaging lens assembly may have a good ability to balance chromatic aberrations.

The total effective focal length f of the optical imaging lens assembly and an entrance pupil diameter EPD of the optical imaging lens assembly may satisfy: f/EPD≤1.8, and more specifically, f and EPD may further satisfy: 1.68≤f/EPD≤1.78. The smaller the F-number Fno (i.e., the total effective focal length f of the lens assembly/the entrance pupil diameter EPD of the lens assembly) of the optical imaging lens assembly is, the larger the aperture of the lens assembly is, and the greater the amount, of light admitted in the identical time unit is. The reduction of the F-number Fno may effectively enhance the brightness of the image plane, so that the lens assembly can better meet the shooting requirements when the light is insufficient. When the lens assembly is configured to satisfy the conditional expression f/EPD≤1.8, the lens assembly may have a large-aperture advantage in the process of increasing the amount of light admitted, thereby enhancing the imaging effect in a dark environment while improving edge ray aberrations.

A total track length TTL of the optical imaging lens assembly (i.e., the distance on the axis from a center of the object-side surface of the first lens to the image plane of the optical imaging lens assembly) and half of a diagonal length ImgH of an effective pixel area on the image plane of the optical imaging lens assembly may satisfy: TTL/ImgH≤1.7, and more specifically, TTL and ImgH may further satisfy: 1.5≤TTL/ImgH≤1.64. By controlling the ratio of the total track length of the lens assembly to the image height, the total size of the imaging lens assembly may effectively be compressed to achieve an ultra-thin characteristic and miniaturization of the imaging lens assembly, so that the imaging lens assembly can be more applicable to the size-restricted systems such as portable electronic products.

In the exemplary implementations, the optical imaging lens assembly may also be provided with at least one diaphragm to improve the imaging quality of the lens assembly. It should be understood by those skilled in the art that the diaphragm may be disposed at any position between the object side and the image side as needed. That is, the position of the the diaphragm should not be limited to the positions described in the following embodiments.

Alternatively, the optical imaging lens assembly may further include an optical filter for correcting color deviations and/or a protective glass for protecting the photosensitive element on the image plane.

The optical imaging lens assembly according to the above implementations of the present disclosure may use multiple lenses, for example, six lenses described above. By reasonably distributing the refractive powers and the surface types of the lenses, the center thicknesses of the lenses, the spacing distances on the axis between the lenses, etc., the sensitivity of the lens assembly may effectively be reduced and the processability of the lens assembly may effectively be improved, thus making the optical imaging lens assembly more conducive to the production and processing and applicable to the portable electronic products. Meanwhile, the optical imaging lens assembly with the above configuration may further have beneficial effects such as ultra-thin, large-aperture, and high image quality.

In the implementations of the present disclosure, at least one of the surfaces of the lenses is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. In addition, the use of the aspheric lens may also effectively reduce the number of lenses in the optical system.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having six lenses is described as an example in the implementations, the optical imaging lens assembly is not limited to include six lenses. If desired, the optical imaging lens assembly may also include other numbers of lenses.

Specific embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1-2D. FIG. 1 is a schematic structural diagram illustrating the optical imaging lens assembly according to Embodiment 1 of the present disclosure.

As shown in FIG. 1, the optical imaging lens assembly includes, sequentially along an optical axis from an object side to an image side, a first lens E1, a second lens E2, a third lens E3, a fourth lens E4, a fifth lens E5, a sixth lens E6, and an image plane S15. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a negative refractive power, an object-side surface S5 of the third lens E3 is a concave surface, and an image-side surface S6 of the third lens E3 is a convex surface. The object-side surface S5 and the image-side surface S6 of the third lens E3 are both aspheric surfaces.

The fourth lens E4 has a positive refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a positive refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the object side and the first lens E1, to improve the imaging quality of the optical imaging lens assembly.

Table 1 shows the surface type, the radius of curvature, the thickness, the material and the conic coefficient of each lens of the optical imaging lens assembly in Embodiment 1. The radius of curvature and the thickness are both shown in millimeters (mm).

TABLE 1

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.4116 | | | |
| S1 | aspheric | 1.6737 | 0.7425 | 1.62 | 64.1 | −2.5577 |

TABLE 1-continued

| surface number | surface type | radius of curvature | thickness | refractive index | abbe number | conic coefficient |
|---|---|---|---|---|---|---|
| S2 | aspheric | 5.3764 | 0.0750 | | | −41.0243 |
| S3 | aspheric | 4.2247 | 0.2400 | 1.67 | 20.4 | −24.6414 |
| S4 | aspheric | 2.6576 | 0.3944 | | | −16.7239 |
| S5 | aspheric | −84.1830 | 0.5779 | 1.55 | 56.1 | −2.6765 |
| S6 | aspheric | −120.8071 | 0.3868 | | | 80.0000 |
| S7 | aspheric | −18.5456 | 0.4815 | 1.55 | 56.1 | −58.4532 |
| S8 | aspheric | −1.7565 | 0.0300 | | | −13.1471 |
| S9 | aspheric | −36.1652 | 0.3500 | 1.65 | 23.5 | 17.7934 |
| S10 | aspheric | −16.0384 | 0.0840 | | | 1.7510 |
| S11 | aspheric | 6.1561 | 0.3300 | 1.54 | 55.7 | −24.8728 |
| S12 | aspheric | 1.1969 | 0.5107 | | | −6.3972 |
| S13 | spherical | infinite | 0.2100 | 1.52 | 64.2 | |
| S14 | spherical | infinite | 0.3371 | | | |
| S15 | spherical | infinite | | | | |

As may be obtained from Table 1, the center thickness CT1 of the first lens E1 on the optical axis and the center thickness CT2 of the second lens E2 on the optical axis satisfy: CT1/CT2=3.09. The abbe number V1 of the first lens E1 and the abbe number V2 of the second lens E2 satisfy: V1/V2=3.14.

In this embodiment, the optical imaging lens assembly having six lenses is used as an example. By reasonably distributing the focal lengths, the surface types and the center thicknesses of the lenses, and the spacing distances between the lenses, the amount of light admitted is increased and the imaging quality of the lens assembly is improved while the miniaturization of the lens assembly is achieved. Each lens may adopt an aspheric lens, and the surface type x of each aspheric surface is defined by the following formula:

$$x = \frac{ch^2}{1+\sqrt{1-(k+1)c^2h^2}} + \sum A_i h^i. \quad (1)$$

Here, x is the distance sagittal height to the vertex of the aspheric surface when the aspheric surface is at a position of a height h along the optical axis; c is the paraxial curvature of the aspheric surface, and c=1/R (i.e., the paraxial curvature c is the reciprocal of the radius of curvature R in Table 1 above); k is the conic coefficient (given in Table 1 above); and $A_i$ is the correction coefficient of the $i^{th}$ order of the aspheric surface. Table 2 below shows the high-order coefficients $A_4$, $A_6$, $A_8$, $A_{10}$, $A_{12}$, $A_{14}$, and $A_{16}$ applicable to the aspheric surfaces S1-S12 in Embodiment 1.

TABLE 2

| surface number | A4 | A6 | A8 | A10 | A12 | A14 | A16 |
|---|---|---|---|---|---|---|---|
| S1 | 6.1503E−02 | 9.8254E−03 | −4.8419E−02 | 7.5778E−02 | −7.0247E−02 | 3.2873E−02 | −7.0505E−03 |
| S2 | −1.0788E−01 | 1.0714E−01 | 8.5427E−02 | −3.8756E−01 | 4.6600E−01 | −2.6404E−01 | 5.8382E−12 |
| S3 | −1.6197E−01 | 2.6212E−01 | 7.1959E−02 | −5.6650E−01 | 7.3097E−01 | −4.1333E−01 | 8.8677E−02 |
| S4 | 3.6309E−02 | 3.0429E−02 | 4.5209E−01 | −1.2915E+00 | 1.9176E+00 | −1.4841E+00 | 5.2145E−01 |
| S5 | −1.0598E−01 | −1.3125E−01 | 6.0651E−01 | −1.7206E+00 | 2.7621E+00 | −2.3642E+00 | 8.6203E−01 |
| S6 | −7.7441E−02 | −6.4387E−02 | 8.2649E−02 | −1.3492E−01 | 1.5097E−01 | −8.6394E−02 | 2.1849E−02 |
| S7 | 4.5638E−02 | −1.2372E−02 | −2.2848E−02 | −2.8653E−02 | 4.3012E−02 | −2.1252E−02 | 3.8546E−03 |
| S8 | −7.0280E−02 | 1.6027E−01 | −2.0263E−01 | 1.4419E−01 | −5.6981E−02 | 1.1302E−02 | −8.6592E−04 |
| S9 | 1.2026E−01 | −2.4979E−01 | 1.0022E−01 | 1.1263E−02 | −1.8397E−02 | 4.9245E−03 | −4.4309E−04 |
| S10 | 2.2513E−01 | −4.1935E−01 | 2.8406E−01 | −1.0671E−01 | 2.3803E−02 | −2.9260E−03 | 1.5148E−04 |
| S11 | −2.0941E−01 | 1.7045E−02 | 6.1951E−02 | −3.3171E−02 | 7.6601E−03 | −8.6246E−04 | 3.8700E−05 |
| S12 | −1.9957E−01 | 1.3111E−01 | −5.1840E−02 | 1.2403E−02 | −1.7954E−03 | 1.4443E−04 | −4.9116E−06 |

Table 3 below shows the effective focal lengths f1-f6 of the lenses in Embodiment 1, the total effective focal length f of the optical imaging lens assembly, the total track length TTL, of the optical imaging lens assembly (i.e., the distance on the optical axis from the center of the object-side surface S1 of the first lens E1 to the image plane S15), and the half of the diagonal length ImgH of the effective pixel area on the image plane S15 of the optical imaging lens assembly.

TABLE 3

| parameter | | | | | | | | |
|---|---|---|---|---|---|---|---|---|
| f1 (mm) | f2 (mm) | f3 (mm) | f4 (mm) | f5 (mm) | f6 (mm) | f (mm) | TTL (mm) | ImgH (mm) |
| numerical value | | | | | | | | |
| 3.60 | −11.43 | −510.95 | 3.51 | 4.38 | −2.83 | 3.84 | 4.75 | 3.05 |

As may be obtained from Table 3, the effective focal length f1 of the first lens E1 and the effective focal length f2 of the second lens E2 satisfy: f1/f2=−0.32. The effective focal length f1 of the first lens E1 and the total effective focal length f of the optical imaging lens assembly satisfy: f/f1=1.07. The effective focal length f4 of the fourth lens E4 and the total effective focal length f of the optical imaging lens assembly satisfy: f4/f=0.91. The total track length TTL of the optical imaging lens assembly and the half of the diagonal length ImgH of the effective pixel area on the image plane S15 of the optical imaging lens assembly satisfy: TTL/ImgH=1.56. It may be obtained from Tables 1 and 3 that the total effective focal length f of the optical imaging lens assembly and the radius of curvature R1 of the object-side surface S1 of the first lens E1 satisfy: f/R1=2.30. The total effective focal length f of the optical imaging lens assembly and the radius of curvature R9 of the object-side surface S9 of the fifth lens E5 satisfy: f/|R9|=0.11. The total effective focal length f of the optical imaging lens assembly and the radius of curvature R10 of the image-side surface S10 of the fifth lens E5 satisfy: f/|R10|=0.24. The total effective focal length f of the optical imaging lens assembly and the radius of curvature R12 of the image-side surface S12 of the sixth lens E6 satisfy: f/R12=3.21.

In Embodiment 1, the total effective focal length f of the optical imaging lens assembly and and the entrance pupil diameter EPD of the optical imaging lens assembly satisfy: f/EPD=1.68. The incident angle β62 of the upper ray of the maximal field of view entering on the image-side surface of the sixth lens satisfies: β62=10.7°.

Figure 2D:
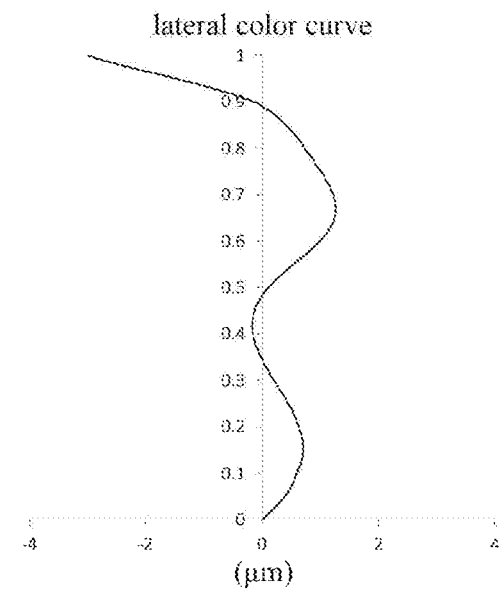

FIG. 2A illustrates the longitudinal aberration curve of the optical imaging lens assembly according to Embodiment 1, representing deviations of focal points of light of different wavelengths converged after passing through the lens assembly. FIG. 2B illustrates the astigmatic curve of the optical imaging lens assembly according to Embodiment 1, representing a curvature of the tangential image plane and a curvature of the sagittal image plane. FIG. 2C illustrates the distortion curve of the optical imaging lens assembly according to Embodiment 1, representing amounts of distortion at different viewing angles. FIG. 2D illustrates the lateral color curve of the optical imaging lens assembly according to Embodiment 1, representing deviations of different image heights on the image plane after light passes through the lens assembly. It can be seen from FIGS. 2A-2D that the optical imaging lens assembly according to Embodiment 1 can achieve a good imaging quality.

Embodiment 2

Figure 3:
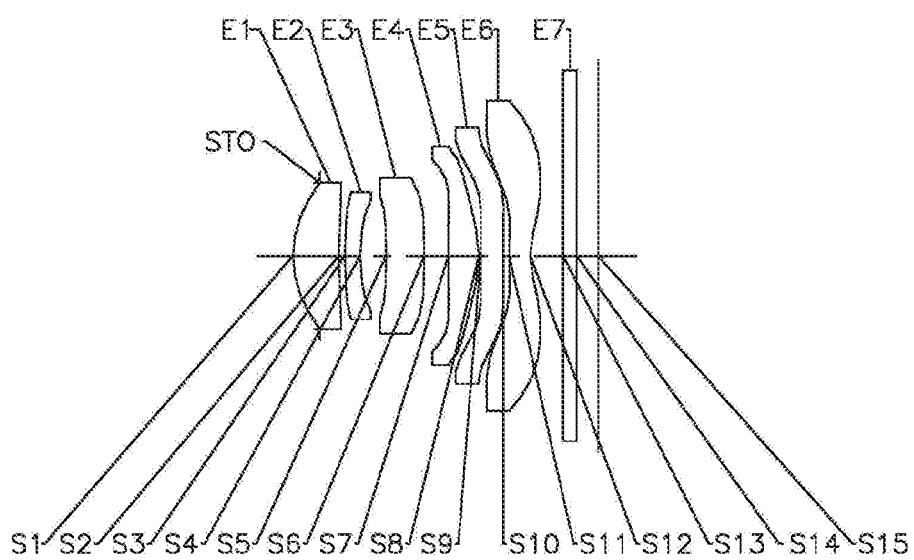
FIG. 3 is a schematic structural diagram illustrating an optical imaging lens assembly according to Embodiment 2 of the present disclosure.

An optical imaging lens assembly according to Embodiment 2 of the present disclosure is described below with reference to FIGS. 3-4D. In this embodiment and the following embodiments, for the purpose of brevity, the description of parts similar to those in Embodiment 1 will be omitted. FIG. 3 is a schematic structural diagram illustrating the optical imaging lens assembly according to Embodiment 2 of the present disclosure.

As shown in FIG. 3, the optical imaging lens assembly includes, sequentially along an optical axis from an object side to an image side, a first lens E1, a second lens E2, a third lens E3, a fourth lens E4, a fifth lens E5, a sixth lens E6, and an image plane S15. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a negative refractive power, an object-side surface S5 of the third lens E3 is a concave surface, and an image-side surface S6 of the third lens S3 is a concave surface. The object-side surface S5 and the image-side surface S6 of the third lens E3 are both aspheric surfaces.

The fourth lens E4 has a positive refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a positive refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the object side and the first lens E1, to improve the image quality of the optical imaging lens assembly.

Table 4 shows the surface type, the radius of curvature, the thickness, the material and the conic coefficient of each lens of the optical imaging lens assembly in Embodiment 2. The radius of curvature and the thickness are both shown in millimeters (mm). Table 5 shows the high-order coefficients applicable to each aspheric surface in Embodiment 2. The surface type of each aspheric surface may be defined by the formula (1) given in Embodiment 1. Table 6 shows the effective focal lengths f1-f6 of the lenses in Embodiment 2, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 4

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4145 | | | |
| S1 | aspheric | 1.6618 | 0.7150 | 1.62 | 64.1 | −2.5206 |
| S2 | aspheric | 5.1590 | 0.0883 | | | −36.3635 |
| S3 | aspheric | 4.2648 | 0.2400 | 1.67 | 20.4 | −25.8259 |
| S4 | aspheric | 2.6773 | 0.4023 | | | −17.7694 |
| S5 | aspheric | −10000.0000 | 0.5971 | 1.55 | 56.1 | 80.0000 |
| S6 | aspheric | 72.3563 | 0.3738 | | | −80.0000 |
| S7 | aspheric | −32.1493 | 0.4750 | 1.55 | 56.1 | −80.0000 |
| S8 | aspheric | −1.8285 | 0.0300 | | | −13.8642 |
| S9 | aspheric | −55.5400 | 0.3500 | 1.65 | 23.5 | −80.0000 |
| S10 | aspheric | −21.0875 | 0.0903 | | | −2.1164 |
| S11 | aspheric | 5.0910 | 0.3300 | 1.54 | 55.7 | −29.6745 |
| S12 | aspheric | 1.1815 | 0.5111 | | | −6.0406 |
| S13 | spherical | infinite | 0.2100 | 1.52 | 64.2 | |
| S14 | spherical | infinite | 0.3371 | | | |
| S15 | spherical | infinite | | | | |

TABLE 6

| surface number | A4 | A6 | A8 | A10 | A12 | A14 | A16 |
|---|---|---|---|---|---|---|---|
| S1 | 6.2687E−02 | 8.6605E−03 | −4.5636E−02 | 7.4360E−02 | −7.1432E−02 | 3.4569E−02 | −7.7543E−03 |
| S2 | −9.3123E−02 | 7.8171E−02 | 8.3047E−02 | −3.0703E−01 | 3.4659E−01 | −1.8953E−01 | 4.0751E−02 |
| S3 | −1.5378E−01 | 2.3354E−01 | 7.0522E−02 | −4.4852E−01 | 5.2903E−01 | −2.7278E−01 | 5.2708E−02 |
| S4 | 3.3410E−02 | 2.6340E−02 | 4.4699E−01 | −1.1914E+00 | 1.7019E+00 | −1.2890E+00 | 4.5150E−01 |
| S5 | −1.1041E−01 | −1.2281E−01 | 5.8468E−01 | −1.6380E+00 | 2.5744E+00 | −2.1534E+00 | 7.6605E−01 |
| S6 | −8.2993E−02 | −6.2310E−02 | 9.2223E−02 | −1.6090E−01 | 1.7545E−01 | −9.5870E−02 | 2.2427E−02 |
| S7 | 4.2345E−02 | 4.0006E−03 | −4.0589E−02 | −8.9978E−03 | 2.8162E−02 | −1.5030E−02 | 2.7516E−03 |
| S8 | −6.5886E−02 | 1.5441E−01 | −1.8932E−01 | 1.3690E−01 | −5.6653E−02 | 1.2038E−02 | −1.0182E−03 |
| S9 | 1.3203E−01 | −2.7606E−01 | 1.2589E−01 | −3.5591E−03 | −1.3014E−02 | 3.8295E−03 | −3.5125E−04 |
| S10 | 2.3162E−01 | −4.3738E−01 | 3.0172E−01 | −1.1504E−01 | 2.5883E−02 | −3.1933E−03 | 1.6550E−04 |
| S11 | −2.1677E−01 | 1.7989E−01 | 6.6332E−02 | −3.6138E−02 | 8.4840E−03 | −9.7009E−04 | 4.4156E−05 |
| S12 | −2.1120E−01 | 1.4160E−01 | −5.7738E−02 | 1.4432E−02 | −2.2087E−03 | 1.8958E−04 | −6.9285E−06 |

TABLE 6

| | parameter | | | | | | | | |
|---|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.63 | −11.47 | −131.44 | 3.53 | 52.50 | −2.95 | 3.84 | 4.75 | 3.05 |

Figure 4A:
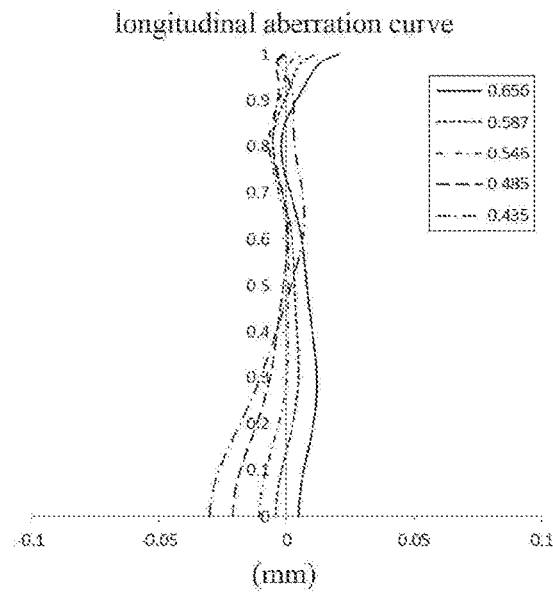
FIGS. 4A-4D respectively illustrate a longitudinal aberration curve, an astigmatic curve, a distortion curve, and a lateral color curve of the optical imaging lens assembly according to Embodiment 2.
Figure 4B:
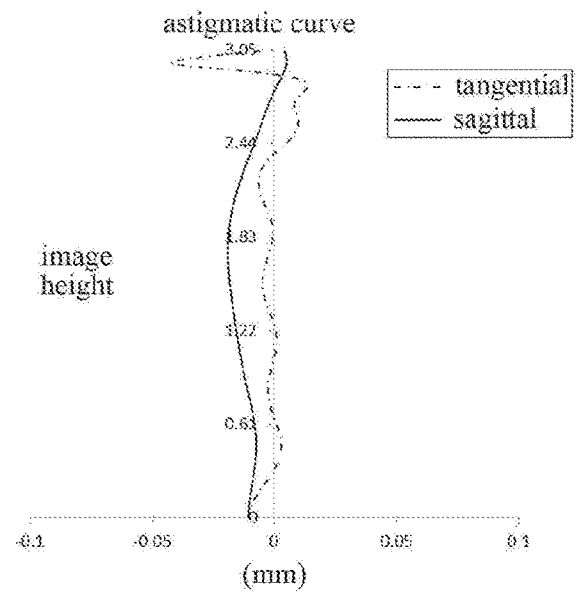
Figure 4C:
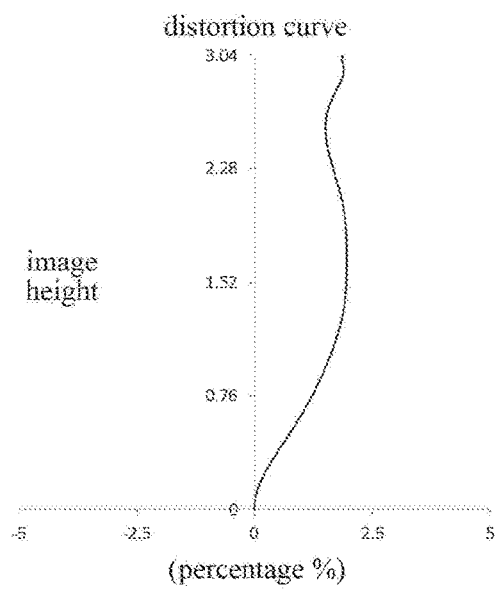
Figure 4D:
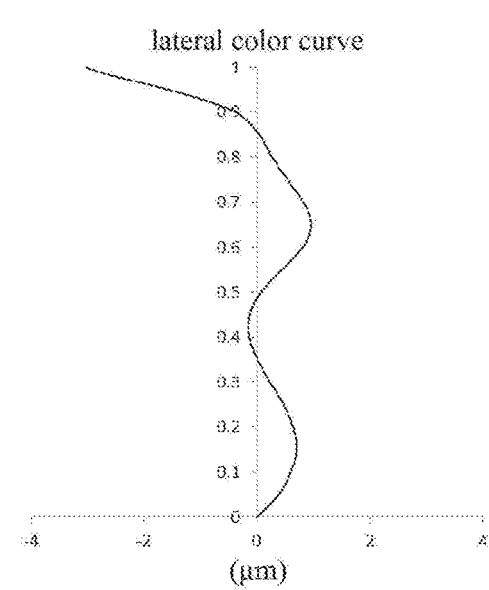

FIG. 4A illustrates the longitudinal aberration curve of the optical imaging lens assembly according to Embodiment 2, representing deviations of focal points of light of different wavelengths converged after passing through the lens assembly. FIG. 4b illustrates the astigmatic curve of the optical imaging lens assembly according to Embodiment 2, representing a curvature of the tangential image plane and a curvature of the sagittal image plane. FIG. 4C illustrates the distortion curve of the optical imaging lens assembly according to Embodiment 2, representing amounts of distortion at different viewing angles. FIG. 4D illustrates the lateral color curve of the optical imaging lens assembly according to Embodiment 2, representing deviations of different image heights on the image plane after light passes through the lens assembly. It can be seen from FIGS. 4A-4D that the optical imaging lens assembly according to Embodiment 2 can achieve a good imaging quality.

Embodiment 3

Figure 5:
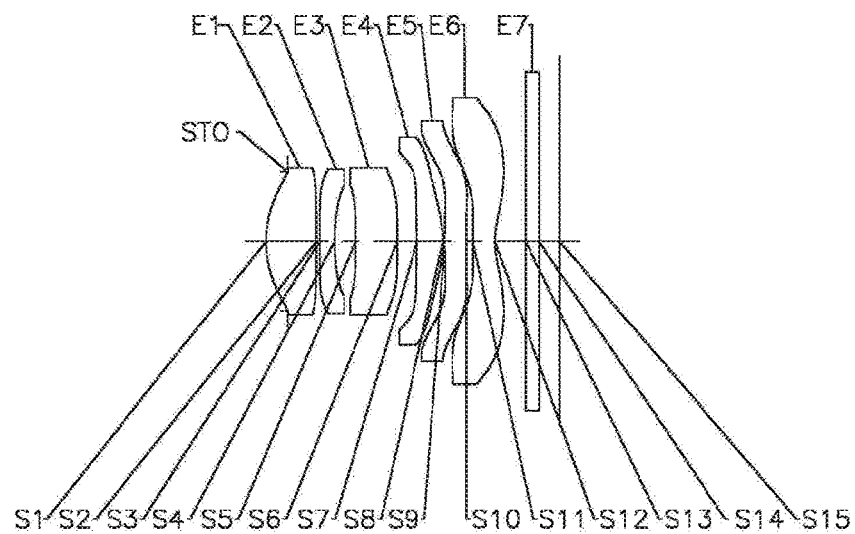
FIG. 5 is a schematic structural diagram illustrating an optical imaging lens assembly according to Embodiment 3 of the present disclosure.

An optical imaging lens assembly according to Embodiment 3 of the present disclosure is described below with reference to FIGS. 5-6D. FIG. 5 is a schematic structural diagram illustrating the optical imaging lens assembly according to Embodiment 3 of the present disclosure.

As shown in FIG. 5, the optical imaging lens assembly includes, sequentially along an optical axis from an object side to an image side, a first lens E1, a second lens E2, a third lens E3, a fourth lens E4, a fifth lens E5, a sixth lens E6, and an image plane S15. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a convex surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a negative refractive power, an object-side surface S5 of the third lens E3 is a concave surface, and an image-side surface S6 of the third lens E3 is a convex surface. The object-side surface S5 and the image-side surface S6 of the third lens E3 are both aspheric surfaces.

The fourth lens E4 has a positive refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the object side and the first lens E1, to improve the imaging quality of the optical imaging lens assembly.

Table 7 shows the surface type, the radius of curvature, the thickness, the material and the conic coefficient of each lens of the optical imaging lens assembly in Embodiment 3. The radius of curvature and the thickness are both shown in millimeters (mm). Table 8 shows the high-order coefficients applicable to each aspheric surface in Embodiment 3. The surface type of each aspheric surface may be defined by the formula (1) given in Embodiment 1. Table 9 shows the effective focal lengths f1-f6 of the lenses in Embodiment 3, the total effective focal length f of the optical imaging lens assembly, the total track length TTL of the optical imaging lens-assembly, and the half of the diagonal length ImgH of the effective pixel area on the image plane S15 of the optical imaging lens assembly.

TABLE 7

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.3511 | | | |
| S1 | aspheric | 1.7842 | 0.8170 | 1.62 | 64.1 | −3.3343 |
| S2 | aspheric | −204.9033 | 0.0471 | | | −80.0000 |
| S3 | aspheric | 17.0302 | 0.2403 | 1.67 | 20.4 | 80.0000 |
| S4 | aspheric | 3.0836 | 0.3422 | | | −23.7094 |
| S5 | aspheric | −183.0985 | 0.6731 | 1.55 | 56.1 | −80.0000 |
| S6 | aspheric | −524.3826 | 0.3244 | | | 80.0000 |
| S7 | aspheric | −10.8785 | 0.4204 | 1.55 | 56.1 | 6.8274 |
| S8 | aspheric | −1.8390 | 0.0300 | | | −12.7501 |
| S9 | aspheric | 38.4549 | 0.3500 | 1.65 | 23.5 | −68.9524 |
| S10 | aspheric | −25.0081 | 0.1026 | | | 51.4808 |
| S11 | aspheric | 8.8404 | 0.3581 | 1.54 | 55.7 | −0.8744 |
| S12 | aspheric | 1.3043 | 0.4978 | | | −7.0928 |
| S13 | spherical | infinite | 0.2100 | 1.52 | 64.2 | |
| S14 | spherical | infinite | 0.3371 | | | |
| S15 | spherical | infinite | | | | |

TABLE 8

| surface number | A4 | A6 | A8 | A10 | A12 | A14 | A16 |
|---|---|---|---|---|---|---|---|
| S1 | 5.7398E−02 | 3.7527E−02 | −1.5996E−01 | 2.5988E−01 | −2.4032E−01 | 1.1312E−01 | −2.1899E−02 |
| S2 | −1.1782E−01 | 3.4423E−01 | −5.8428E−01 | 5.6357E−01 | −3.2591E−01 | 1.0928E−01 | −1.8318E−02 |
| S3 | −1.6921E−01 | 6.3560E−01 | −1.1440E+00 | 1.3546E+00 | −1.0119E+00 | 4.6845E−01 | −1.0376E−01 |
| S4 | 1.6396E−02 | 2.1256E−01 | −3.0961E−01 | 5.9850E−03 | 7.5499E−01 | −1.0248E+00 | 4.8868E−01 |
| S5 | −1.1151E−01 | −1.3488E−01 | 7.0287E−01 | −2.0639E+00 | 3.2877E+00 | −2.7606E+00 | 9.9463E−01 |
| S6 | −8.6368E−02 | 1.6281E−02 | −1.5233E−01 | 2.2379E−01 | −1.5686E−01 | 5.5324E−02 | −4.4032E−03 |
| S7 | 4.1490E−02 | 5.8795E−02 | −1.4831E−01 | 7.1990E−02 | 1.2901E−03 | −1.5000E−02 | 4.2654E−03 |
| S8 | −5.4914E−02 | 1.4260E−01 | −1.7289E−01 | 1.2654E−01 | −5.4654E−02 | 1.2391E−02 | −1.1399E−03 |
| S9 | 1.3587E−01 | −3.2540E−01 | 1.8288E−01 | −3.8520E−02 | −9.5312E−05 | 1.2107E−03 | −1.3247E−04 |
| S10 | 2.4095E−01 | −4.5694E−01 | 3.2287E−01 | −1.2950E−01 | 3.1508E−02 | −4.2899E−03 | 2.4835E−04 |
| S11 | −1.9726E−01 | 1.5906E−02 | 5.6164E−02 | −2.9409E−02 | 6.6491E−03 | −7.3602E−04 | 3.2644E−05 |
| S12 | −1.8024E−01 | 1.1157E−01 | −4.2038E−02 | 9.4157E−03 | −1.2629E−03 | 9.3904E−05 | −2.9232E−06 |

TABLE 9

| | parameter | | | | | | | | |
|---|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 2.85 | −5.68 | −515.14 | 3.98 | 23.54 | −2.90 | 3.82 | 4.75 | 3.05 |

Figures 6A, 6B:
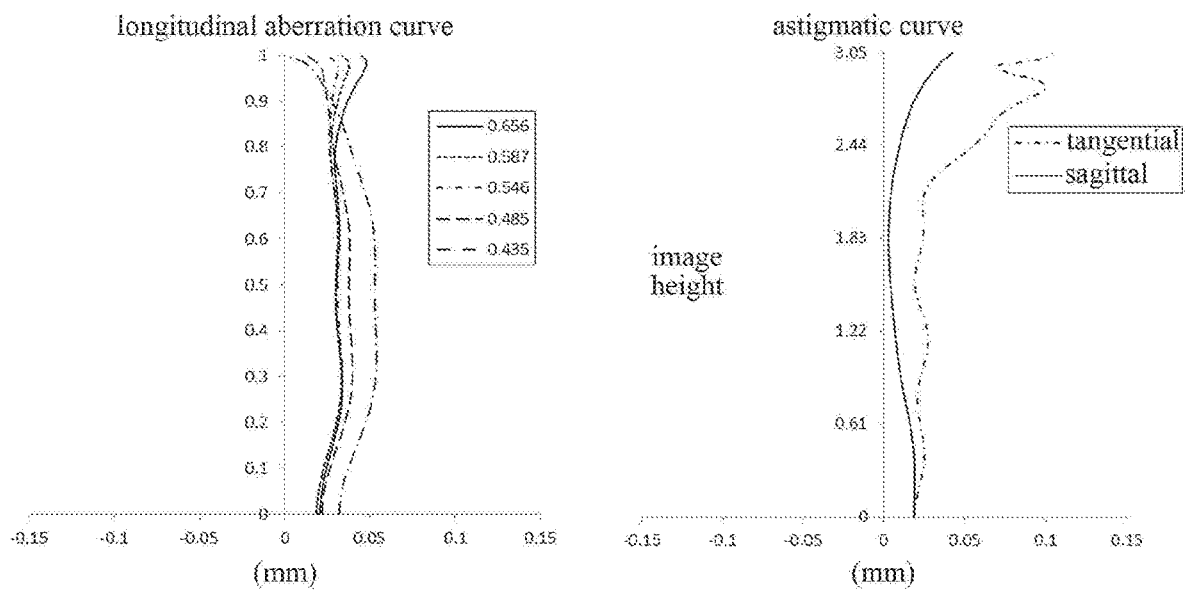
FIGS. 6A-6D respectively illustrate a longitudinal aberration curve, an astigmatic curve, a distortion curve, and a lateral color curve of the optical imaging lens assembly according to Embodiment 3.
Figure 6C:
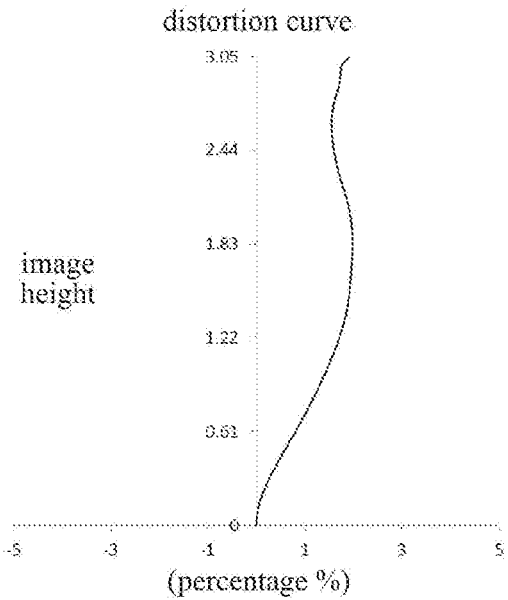
Figure 6D:
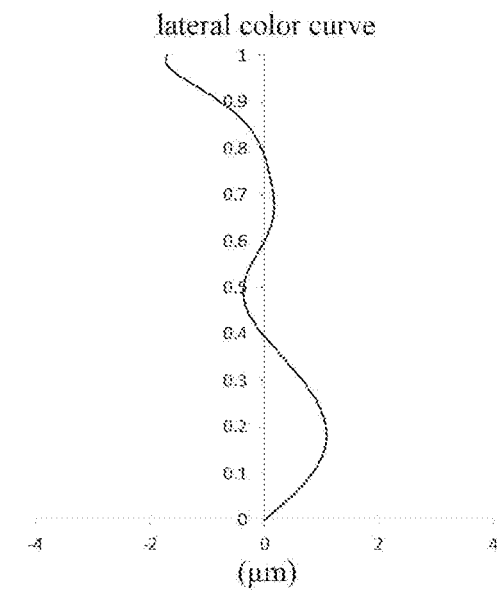

FIG. 6A illustrates the longitudinal aberration curve of the optical imaging lens assembly according to Embodiment 3, representing deviations of focal points of light of different wavelengths converged after passing through the lens assembly. FIG. 6B illustrates the astigmatic curve of the optical imaging lens assembly according to Embodiment 3, representing a curvature of the tangential image plane and a curvature of the sagittal image plane. FIG. 6C illustrates the distortion curve of the optical imaging lens assembly according to Embodiment 3, representing amounts of distortion at different, viewing angles. FIG. 6D illustrates the lateral color curve of the optical imaging lens assembly according to Embodiment 3, representing deviations of different image heights on the image plane after light passes through the lens assembly. It can be seen from FIGS. 6A-6D that the optical imaging lens assembly according to Embodiment 3 can achieve a good imaging quality.

Embodiment 4

Figure 7:
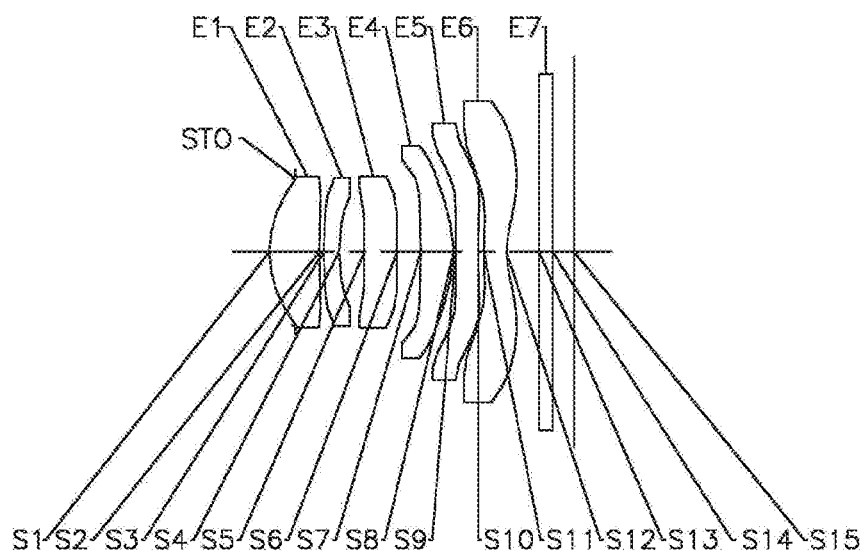
FIG. 7 is a schematic structural diagram illustrating an optical imaging lens assembly according to Embodiment 4 of the present disclosure.

An optical imaging lens assembly according to Embodiment 4 of the present disclosure is described below with reference to FIGS. 7-8D. FIG. 7 is a schematic structural diagram illustrating the optical imaging lens assembly according to Embodiment 4 of the present disclosure.

As shown in FIG. 7, the optical imaging lens assembly includes, sequentially along an optical axis from an object side to an image side, a first lens E1, a second lens E2, a third lens E3, a fourth lens E4, a fifth lens E5, a sixth lens E6, and an image plane S15. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a positive refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a negative refractive power, an object-side surface S9 of the fifth lens E5 is a concave surface, and an image-side surface S10 of the fifth lens E5 is a concave surface. The object-side surface S9 and the image-side surface S10 of the fifth lens E5 are both aspheric surfaces.

The sixth lens E6 has a negative refractive power, an object-side surface S11 of the sixth lens E6 is a convex surface, and an image-side surface S12 of the sixth lens E6 is a concave surface. The object-side surface and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the object side and the first lens E1, to improve the image quality of the optical imaging lens assembly.

Table 10 shows the surface type, the radius of curvature, the thickness, the material and the conic coefficient of each lens of the optical imaging lens assembly in Embodiment 4. The radius of curvature and the thickness are both shown in millimeters (mm). Table 11 shows the high-order coefficients applicable to each aspheric surface in Embodiment 4. The surface type of each aspheric surface may be defined by the formula (1) given in Embodiment 1. Table 12 shows the effective focal lengths f1-f6 of the lenses in Embodiment 4, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 10

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4090 | | | |
| S1 | aspheric | 1.6790 | 0.7766 | 1.62 | 60.4 | −2.6236 |
| S2 | aspheric | 6.1502 | 0.0708 | | | −45.4431 |
| S3 | aspheric | 4.8899 | 0.2400 | 1.67 | 20.4 | −24.0070 |
| S4 | aspheric | 2.7026 | 0.3954 | | | −15.8181 |
| S5 | aspheric | 21.5515 | 0.5080 | 1.55 | 56.1 | −20.5870 |
| S6 | aspheric | 21.3000 | 0.3689 | | | −61.7470 |
| S7 | aspheric | −11.7111 | 0.5130 | 1.55 | 56.1 | −69.4168 |
| S8 | aspheric | −1.7262 | 0.0300 | | | −9.7152 |
| S9 | aspheric | −5158.9502 | 0.3500 | 1.65 | 23.5 | −80.0000 |
| S10 | aspheric | 49.9869 | 0.0883 | | | 70.6350 |
| S11 | aspheric | 4.4473 | 0.3528 | 1.54 | 55.7 | −35.9696 |
| S12 | aspheric | 1.2479 | 0.5091 | | | −6.1878 |
| S13 | spherical | infinite | 0.2100 | 1.52 | 64.2 | |
| S14 | spherical | infinite | 0.3371 | | | |
| S15 | spherical | infinite | | | | |

TABLE 11

| surface number | A4 | A6 | A8 | A10 | A12 | A14 | A16 |
|---|---|---|---|---|---|---|---|
| S1 | 6.1230E−02 | 9.6914E−03 | −5.1005E−02 | 7.8296E−02 | −7.1415E−02 | 3.3084E−02 | −6.9589E−03 |
| S2 | −1.2414E−01 | 1.6440E−01 | −3.9313E−02 | −1.9603E−01 | 2.7475E−01 | −1.5843E−01 | 3.4275E−02 |
| S3 | −1.8033E−01 | 3.5444E−01 | −1.2398E−01 | −3.0374E−01 | 4.9972E−01 | −2.9791E−01 | 6.3553E−02 |
| S4 | 2.1451E−02 | 1.5404E−01 | −1.5537E−02 | −1.1853E−01 | 1.0508E−01 | 5.1356E−02 | −2.8879E−02 |
| S5 | −1.2527E−01 | −9.9046E−04 | 7.5964E−03 | −1.0241E−01 | 2.8890E−01 | −3.6913E−01 | 1.9943E−01 |
| S6 | −8.5292E−02 | −3.2348E−02 | 8.2299E−03 | −4.9017E−02 | 8.9898E−02 | −6.4413E−02 | 1.9961E−02 |
| S7 | 2.6421E−02 | 1.9031E−02 | −5.9176E−02 | −8.5956E−03 | 3.6390E−02 | −2.1129E−02 | 4.3941E−03 |
| S8 | −6.4075E−02 | 1.3629E−01 | −1.5878E−01 | 9.8196E−02 | −3.1266E−02 | 4.2273E−03 | −1.0927E−04 |
| S9 | 9.8044E−02 | −1.8956E−01 | 3.7191E−02 | 4.3633E−02 | −2.6347E−02 | 5.6607E−03 | −4.4081E−04 |
| S10 | 1.8839E−01 | −3.4407E−01 | 2.1472E−01 | −7.4134E−02 | 1.5413E−02 | −1.7953E−03 | 8.9108E−05 |
| S11 | −1.7275E−01 | 1.0926E−02 | 4.5365E−02 | −2.2304E−02 | 4.7859E−03 | −5.0298E−04 | 2.1086E−05 |
| S12 | −1.8744E−01 | 1.1148E−01 | −3.9727E−02 | 8.4697E−03 | −1.0740E−03 | 7.4205E−05 | −2.1123E−06 |

TABLE 12

| | parameter | | | | | | | | |
|---|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.48 | −9.47 | −11673.09 | 3.64 | −76.75 | −3.36 | 3.86 | 4.75 | 3.05 |

Figure 8A:
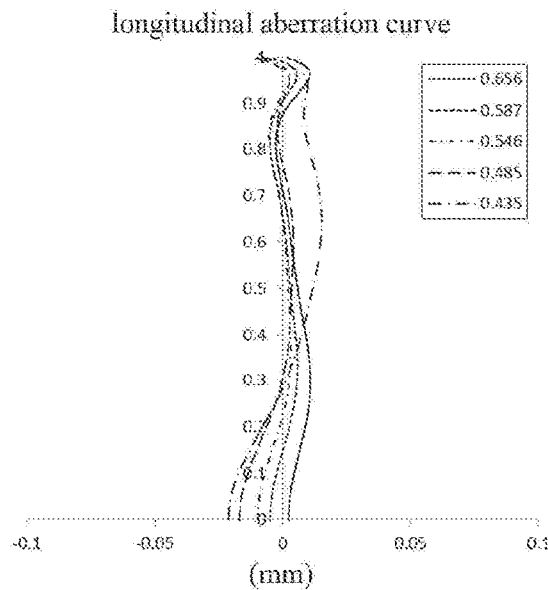
FIGS. 8A-8D respectively illustrate a longitudinal aberration curve, an astigmatic curve, a distortion curve, and a lateral color curve of the optical imaging lens assembly according to Embodiment 4.
Figure 8B:
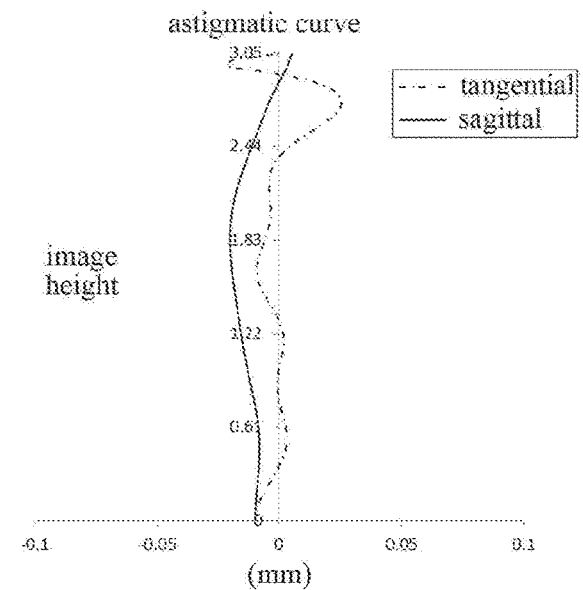
Figure 8C:
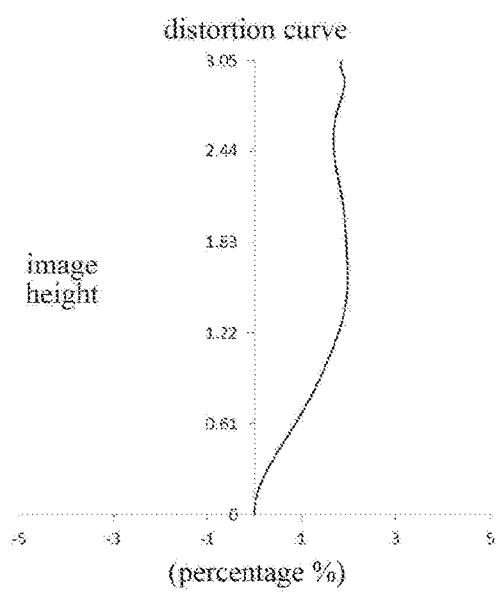
Figure 8D:
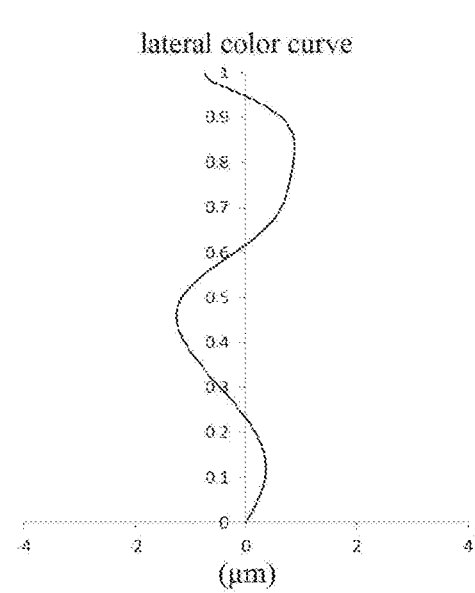

FIG. 8A illustrates the longitudinal aberration curve of the optical imaging lens assembly according to Embodiment 4, representing deviations of focal points of light of different wavelengths converged after passing through the lens assembly. FIG. 8B illustrates the astigmatic curve or the optical imaging lens assembly according to Embodiment 4, representing a curvature of the tangential image plane and a curvature of the sagittal image plane. FIG. 8C illustrates the distortion curve of the optical imaging lens assembly according to Embodiment. 4, representing amounts of distortion at different viewing angles. FIG. 8D illustrates the lateral color curve of the optical imaging lens assembly according to Embodiment 4, representing deviations of different image heights on the image plane after light passes through the lens assembly. It can be seen from FIGS. 8A-8D that the optical imaging lens assembly according to Embodiment 4 can achieve a good imaging quality.

Embodiment 5

Figure 9:
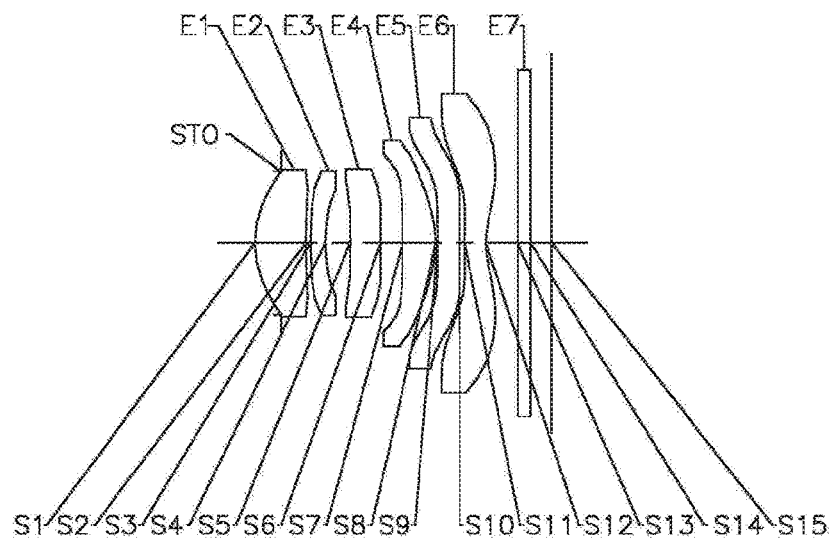
FIG. 9 is a schematic structural diagram illustrating an optical imaging lens assembly according to Embodiment 5 of the present disclosure.

An optical imaging lens assembly according to Embodiment 5 of the present disclosure is described below with reference to FIGS. 9-10D. FIG. 9 is a schematic structural diagram illustrating the optical imaging lens assembly according to Embodiment 5 of the present disclosure.

As shown in FIG. 9, the optical imaging lens assembly includes, sequentially along an optical axis from an object side to an image side, a first lens E1, a second lens E2, a third lens E3, a fourth lens E4, a fifth lens E5, a sixth lens E6, and an image plane S15. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a positive refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a negative refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the object side and the first lens E1, to improve the image quality of the optical imaging lens assembly.

Table 13 shows the surface type, the radius of curvature, the thickness, the material and the conic coefficient of each lens of the optical imaging lens assembly in Embodiment 5.

The radius of curvature and the thickness are both shown in millimeters (mm). Table 14 shows the high-order coefficients applicable to each aspheric surface in Embodiment 5. The surface type of each aspheric surface may be defined by the formula (1) given in Embodiment 1. Table 15 shows the effective focal lengths f1-f6 of the lenses in Embodiment 5, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 13

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4116 | | | |
| S1 | aspheric | 1.6868 | 0.8116 | 1.62 | 64.1 | −2.6251 |
| S2 | aspheric | 5.4610 | 0.0715 | | | −45.0757 |
| S3 | aspheric | 4.4310 | 0.2400 | 1.67 | 20.4 | −22.1321 |
| S4 | aspheric | 2.7243 | 0.3934 | | | −15.9418 |
| S5 | aspheric | 17.8475 | 0.4876 | 1.55 | 56.1 | −63.9923 |
| S6 | aspheric | 15.4836 | 0.3593 | | | −63.4554 |
| S7 | aspheric | −10.7896 | 0.5362 | 1.55 | 56.1 | −42.1660 |
| S8 | aspheric | −1.5675 | 0.0300 | | | −8.5973 |
| S9 | aspheric | −14.3403 | 0.3503 | 1.65 | 23.5 | −55.6184 |
| S10 | aspheric | −15.0000 | 0.0775 | | | 12.4275 |
| S11 | aspheric | 6.5003 | 0.3368 | 1.54 | 55.7 | −37.9492 |
| S12 | aspheric | 1.2435 | 0.5087 | | | −6.8170 |
| S13 | spherical | infinite | 0.2100 | 1.52 | 64.2 | |
| S14 | spherical | infinite | 0.3371 | | | |
| S15 | spherical | infinite | | | | |

TABLE 14

| surface number | A4 | A6 | A8 | A10 | A12 | A14 | A16 |
|---|---|---|---|---|---|---|---|
| S1 | 6.0555E−02 | 5.8092E−03 | −3.9480E−02 | 5.8671E−02 | −5.2338E−02 | 2.3803E−02 | −5.0346E−03 |
| S2 | −1.1654E−01 | 1.2450E−01 | 5.3256E−02 | −3.1606E−01 | 3.6955E−01 | −2.0285E−01 | 4.3708E−02 |
| S3 | −1.7228E−01 | 2.8757E−01 | 8.3000E−02 | −6.2173E−01 | 7.8280E−01 | −4.3955E−01 | 9.3372E−02 |
| S4 | 2.2603E−02 | 1.2581E−01 | 8.2631E−02 | −2.2266E−01 | 9.3248E−02 | 1.6527E−01 | −9.7760E−02 |
| S5 | −1.2894E−01 | 2.4952E−03 | −1.8943E−02 | 3.6619E−03 | 9.6905E−02 | −1.9447E−01 | 1.3534E−01 |
| S6 | −8.4146E−02 | −3.5177E−02 | 7.2855E−03 | −3.4277E−02 | 6.4405E−02 | −4.5877E−02 | 1.5085E−02 |
| S7 | 3.3380E−02 | −1.8211E−02 | 2.5208E−02 | −1.2361E−01 | 1.2591E−01 | −5.7510E−02 | 1.0340E−02 |
| S8 | −6.8643E−02 | 1.4479E−01 | −1.8285E−01 | 1.2190E−01 | −4.0771E−02 | 5.4992E−03 | −8.5891E−05 |
| S9 | 8.7425E−02 | −1.5107E−01 | −2.9102E−02 | 9.8208E−02 | −4.9810E−02 | 1.0762E−02 | −8.8214E−04 |
| S10 | 1.9566E−01 | −3.4582E−01 | 2.1208E−01 | −7.0951E−02 | 1.4058E−02 | −1.5267E−03 | 6.8260E−05 |
| S11 | −1.7476E−01 | 1.3446E−02 | 4.2603E−02 | −2.0705E−02 | 4.3014E−03 | −4.2969E−04 | 1.6715E−05 |
| S12 | −1.7663E−01 | 1.0740E−01 | −4.0417E−02 | 9.2473E−03 | −1.2904E−03 | 1.0147E−04 | −3.4208E−06 |

TABLE 15

| | parameter | | | | | | | | |
|---|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.62 | −11.23 | −230.72 | 3.29 | −638.42 | −2.93 | 3.90 | 4.75 | 3.05 |

Figures 10A, 10B:
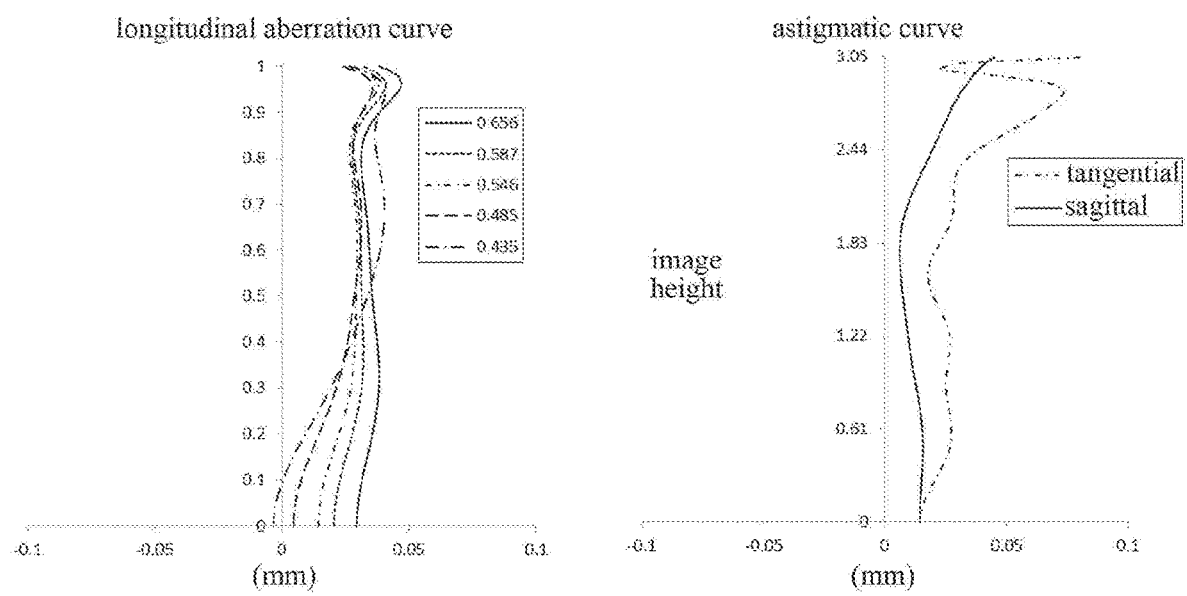
FIGS. 10A-10D respectively illustrate a longitudinal aberration curve, an astigmatic curve, a distortion curve, and a lateral color curve of the optical imaging lens assembly according to Embodiment 5.
Figure 10C:
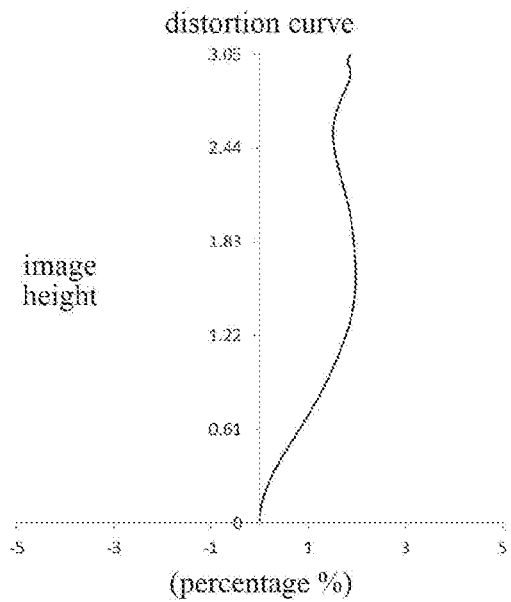
Figure 10D:
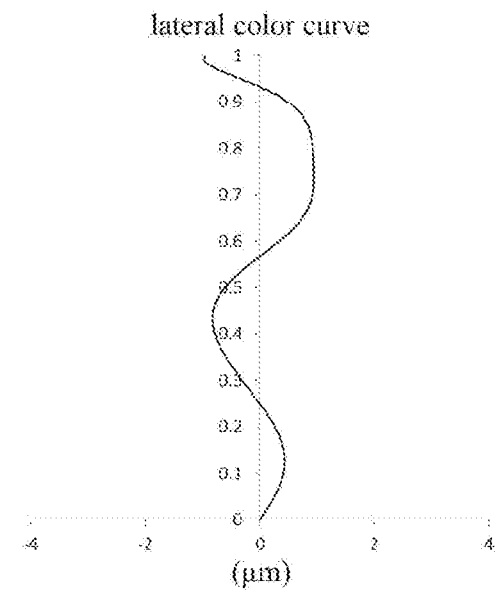

FIG. 10A illustrates the longitudinal aberration curve of the optical imaging lens assembly according to Embodiment 5, representing deviations of focal points of light of different wavelengths converged after passing through the lens assembly. FIG. 10B illustrates the astigmatic curve of the optical imaging lens assembly according to Embodiment 5, representing a curvature of the tangential image plane and a curvature of the sagittal image plane. FIG. 10C illustrates the distortion curve of the optical imaging lens assembly according to Embodiment 5, representing amounts of distortion at different viewing angles. FIG. 10D illustrates the lateral color curve of the optical imaging lens assembly according to Embodiment 5, representing deviations of different image heights on the image plane after light passes through the lens assembly. It can be seen from FIGS. 10A-10D that the optical imaging lens assembly according to Embodiment 5 can achieve a good imaging quality.

Embodiment 6

Figure 11:
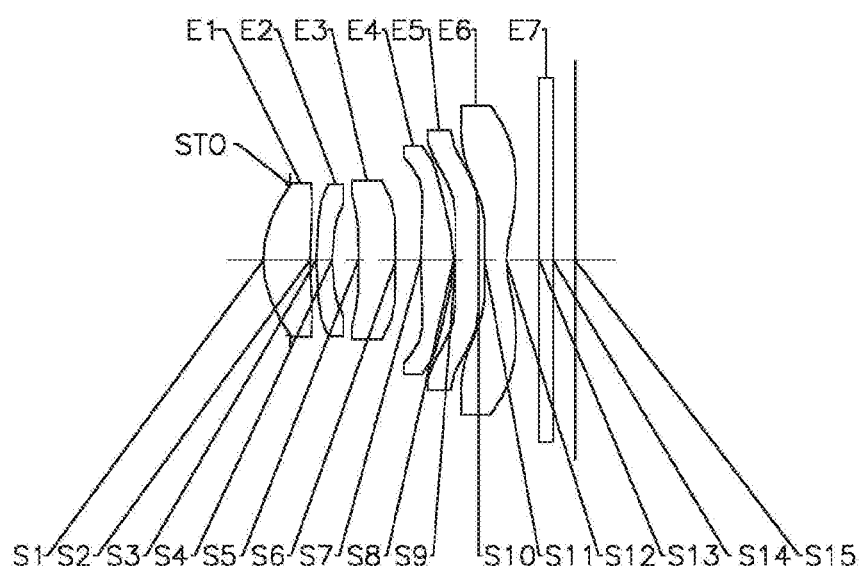
FIG. 11 is a schematic structural diagram illustrating an optical imaging lens assembly according to Embodiment 6 of the present disclosure.

An optical imaging lens assembly according to Embodiment 6 of the present disclosure is described below with reference to FIGS. 11-12D. FIG. 11 is a schematic structural diagram illustrating the optical imaging lens assembly according to Embodiment 6 of the present disclosure.

As shown in FIG. 11, the optical imaging lens assembly includes, sequentially along an optical axis from an object side to an image side, a first lens E1, a second lens E2, a third lens E3, a fourth lens E4, a fifth lens E5, a sixth lens E6, and an image plane S15. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surface.

The third lens E3 has a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a positive refractive power, an object-side surface S7 of the fourth lens E4 is a convex surface, and an image-side surface S8 of the fourth lens E4 is a convex surface. The object-side surface S7 and the image-side surface S8 of the fourth lens E4 are both aspheric surfaces.

The fifth lens E5 has a positive refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the object side and the first lens E1, to improve the image quality of the optical imaging lens assembly.

Table 16 shows the surface type, the radius of curvature, the thickness, the material and the conic coefficient of each lens of the optical imaging lens assembly in Embodiment 6. The radius of curvature and the thickness are both shown in millimeters (mm). Table 17 shows the high-order coefficients applicable to each aspheric surface in Embodiment 6. The surface type of each aspheric surface may be defined by the formula (1) given in Embodiment 1. Table 18 shows the effective focal lengths f1-f6 of the lenses in Embodiment 6, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 16

| surface number | surface type | radius of curvature | thickness | refractive index | abbe number | conic coefficient |
|---|---|---|---|---|---|---|
| OBJ | spherical | infinite | infinite | | | |
| STO | spherical | infinite | -0.4067 | | | |
| S1 | aspheric | 1.6785 | 0.7100 | 1.62 | 64.1 | -2.5787 |
| S2 | aspheric | 5.2021 | 0.0967 | | | -37.6742 |
| S3 | aspheric | 3.8462 | 0.2400 | 1.67 | 20.4 | -25.1493 |
| S4 | aspheric | 2.4759 | 0.4024 | | | -16.8512 |
| S5 | aspheric | 96.5645 | 0.5682 | 1.55 | 56.1 | -80.0000 |
| S6 | aspheric | 34.1251 | 0.3825 | | | 79.1813 |
| S7 | aspheric | 34.1771 | 0.4972 | 1.55 | 56.1 | -80.0000 |
| S8 | aspheric | -1.9214 | 0.0312 | | | -13.8203 |
| S9 | aspheric | -26.4056 | 0.3500 | 1.65 | 23.5 | -44.6756 |
| S10 | aspheric | -13.7458 | 0.0914 | | | -25.7191 |
| S11 | aspheric | 7.2190 | 0.3300 | 1.54 | 55.7 | -23.7817 |
| S12 | aspheric | 1.2358 | 0.5033 | | | -6.4080 |
| S13 | spherical | infinite | 0.2100 | 1.52 | 64.2 | |
| S14 | spherical | infinite | 0.3371 | | | |
| S15 | spherical | infinite | | | | |

TABLE 17

| surface number | A4 | A6 | A8 | A10 | A12 | A14 | A16 |
|---|---|---|---|---|---|---|---|
| S1 | 6.1804E-02 | 3.4033E-03 | -3.4696E-02 | 5.8950E-02 | -6.0090E-02 | 3.0669E-02 | -7.2163E-03 |
| S2 | -1.0144E-01 | 1.0806E-01 | 1.4464E-01 | -2.0290E-01 | 2.4999E-01 | -1.4087E-01 | 3.0573E-02 |
| S3 | -1.6119E-01 | 2.5986E-01 | 2.7605E-02 | -3.7524E-01 | 4.3038E-01 | -2.0243E-01 | 3.2002E-02 |
| S4 | 3.1557E-02 | 5.7324E-01 | 2.7530E-01 | -6.2792E-01 | 7.1338E-01 | -4.1032E-01 | 1.3174E-01 |
| S5 | -1.1395E-01 | -1.6726E-01 | 8.0150E-01 | -2.1428E+00 | 3.2208E+00 | -2.5841E+00 | 8.8092E-01 |

TABLE 17-continued

| surface number | A4 | A6 | A8 | A10 | A12 | A14 | A16 |
|---|---|---|---|---|---|---|---|
| S6 | −9.8597E−02 | −6.1531E−02 | 1.1663E−01 | −2.0560E−01 | 2.1471E−01 | −1.1364E−01 | 2.5674E−02 |
| S7 | 2.3282E−02 | 1.6671E−02 | −4.8096E−02 | 6.1130E−03 | 1.2506E−02 | −8.0734E−03 | 1.6092E−03 |
| S8 | −5.7454E−02 | 1.1753E−01 | −1.2888E−01 | 8.9872E−02 | −3.7302E−02 | 7.9728E−03 | −6.7447E−04 |
| S9 | 1.2721E−01 | −2.8510E−01 | 1.4365E−01 | −1.4727E−02 | −9.6776E−03 | 3.3687E−03 | −3.2997E−04 |
| S10 | 2.4459E−01 | −4.6426E−01 | 3.2676E−01 | −1.2764E−01 | 2.9345E−02 | −3.6789E−03 | 1.9267E−04 |
| S11 | −2.1334E−01 | 1.8068E−02 | 6.4621E−02 | −3.4958E−02 | 8.1245E−03 | −9.1807E−04 | 4.1233E−05 |
| S12 | −2.0793E−01 | 1.4170E−01 | −5.8523E−02 | 1.4868E−02 | −2.3286E−03 | 2.0683E−04 | −7.9281E−06 |

TABLE 18

| | parameter | | | | | | | | |
|---|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.70 | −11.19 | −96.88 | 3.34 | 43.97 | −2.83 | 3.87 | 4.75 | 3.05 |

Figure 12A:
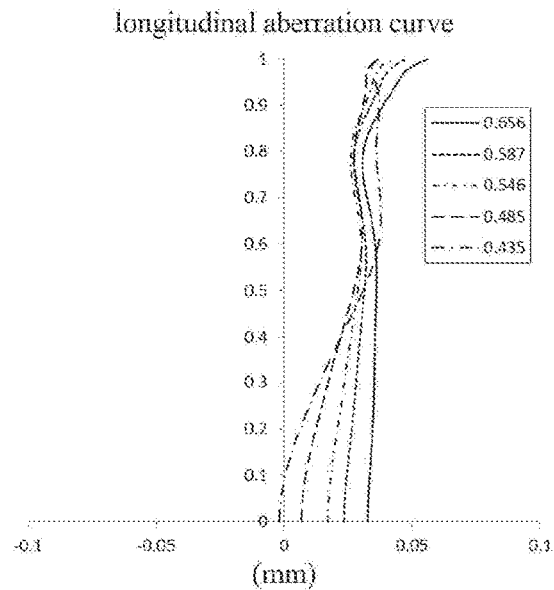
FIGS. 12A-12D respectively illustrate a longitudinal aberration curve, an astigmatic curve, a distortion curve, and a lateral color curve of the optical imaging lens assembly according to Embodiment 6.
Figure 12B:
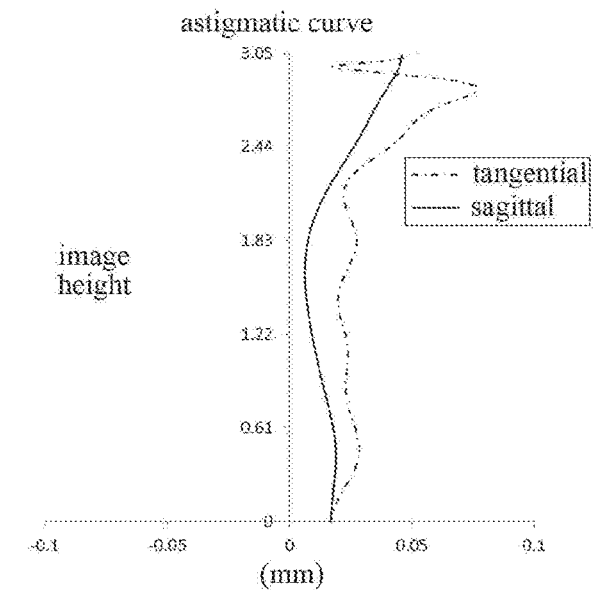
Figure 12C:
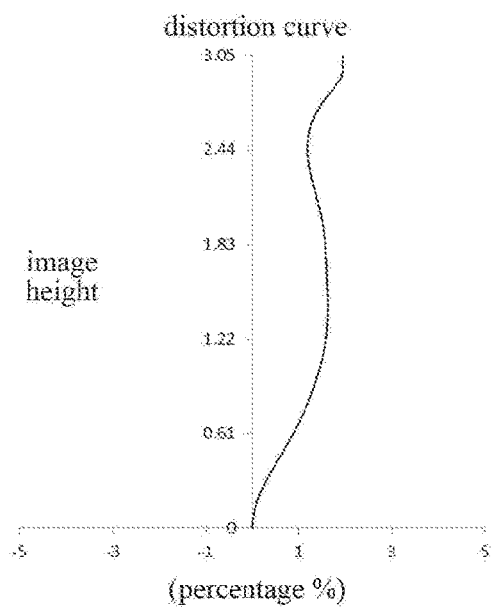
Figure 12D:
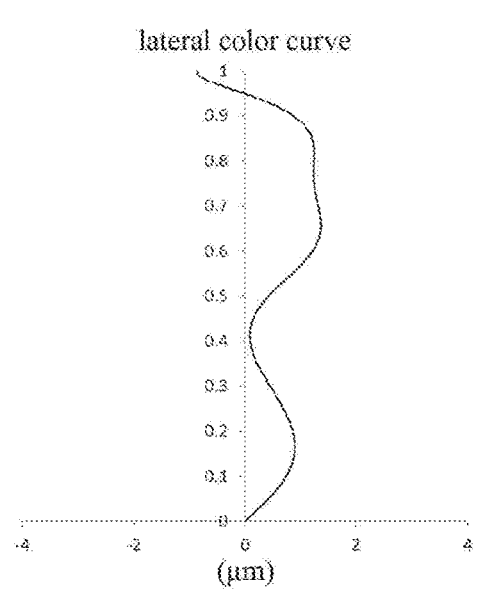

FIG. 12A illustrates the longitudinal aberration curve of the optical imaging lens assembly according to Embodiment 6, representing deviations of focal points of light of different wavelengths converged after passing through the lens assembly. FIG. 12B illustrates the astigmatic curve of the optical imaging lens assembly according to Embodiment 6, representing a curvature of the tangential image plane and a curvature of the sagittal image plane. FIG. 12C illustrates the distortion curve of the optical imaging lens assembly according to Embodiment 6, representing amounts of distortion at different viewing angles. FIG. 12D illustrates the lateral color curve of the optical imaging lens assembly according to Embodiment 6, representing deviations of different image heights on the image plane after light passes through the lens assembly. It can be seen from FIGS. 12A-12D that the optical imaging lens assembly according to Embodiment 6 can achieve a good imaging quality.

Embodiment 7

Figure 13:
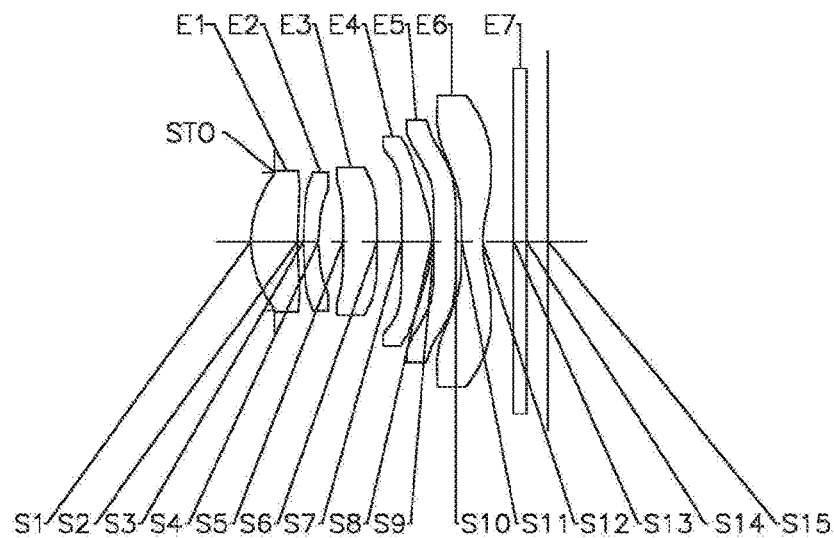
FIG. 13 is a schematic structural diagram illustrating an optical imaging lens assembly according to Embodiment 7 of the present disclosure.
Figures 14A, 14B:
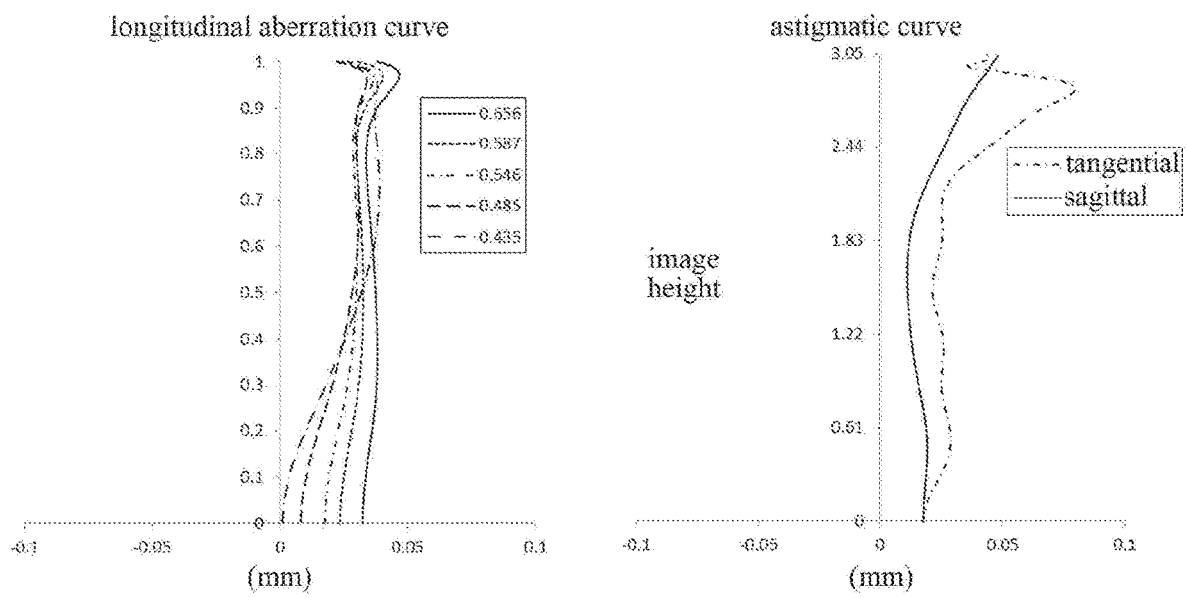
FIGS. 14A-14D respectively illustrate a longitudinal aberration curve, an astigmatic curve, a distortion curve, and a lateral color curve of the optical imaging lens assembly according to Embodiment 7.
Figure 14C:
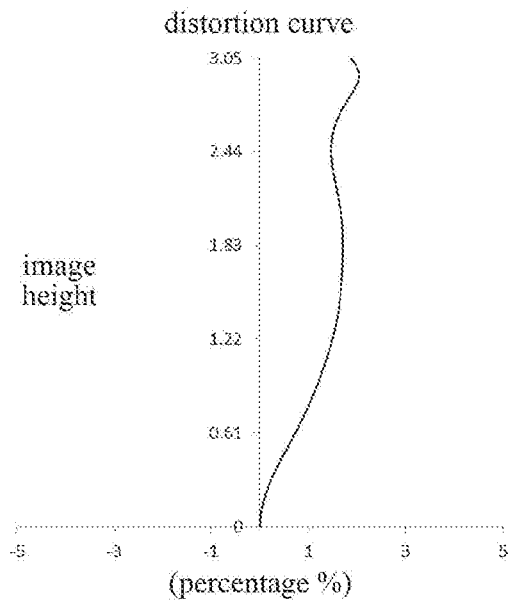
Figure 14D:
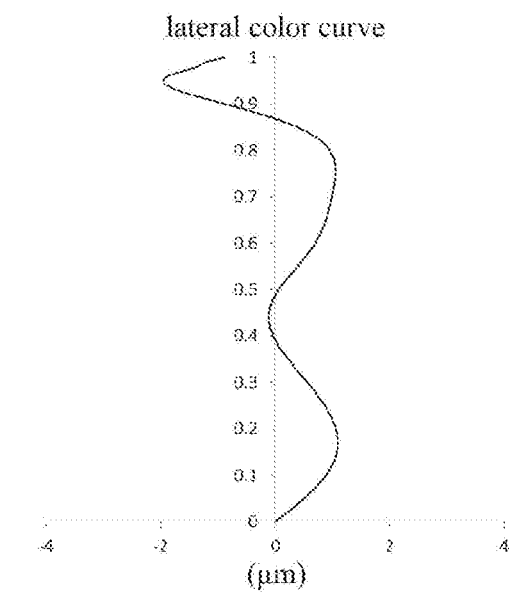

An optical imaging lens assembly according to Embodiment 7 of the present disclosure is described below with reference to FIGS. 13-14D, FIG. 13 is a schematic structural diagram illustrating the optical imaging lens assembly according to Embodiment 7 of the present disclosure.

As shown in FIG. 13, the optical imaging lens assembly includes, sequentially along an optical axis from an object side to an image side, a first lens E1, a second lens E2, a third lens E3, a fourth lens E4, a fifth lens E5, a sixth lens E6, and an image plane S15. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surface.

The third lens E3 has a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a positive refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a positive refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the object side and the first lens E1, to improve the image quality of the optical imaging lens assembly.

Table 19 shows the surface type, the radius of curvature, the thickness, the material and the conic coefficient of each lens of the optical imaging lens assembly in Embodiment 7. The radius of curvature and the thickness are both shown in millimeters (mm). Table 20 shows the high-order coefficients applicable to each aspheric surface in Embodiment 7. The surface type of each aspheric surface may be defined by the formula (1) given in Embodiment 1. Table 21 shows the effective focal lengths f1-f6 of the lenses in Embodiment 7, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 19

| surface number | surface type | radius of curvature | thick-ness | material refrac-tive index | abbe num-ber | conic coefficient |
|---|---|---|---|---|---|---|
| OBJ | spherical | infinite | infinite | | | |
| STO | spherical | infinite | −0.3790 | | | |
| S1 | aspheric | 1.6781 | 0.7508 | 1.62 | 64.1 | −2.6015 |
| S2 | aspheric | 5.7905 | 0.0887 | | | −38.2848 |
| S3 | aspheric | 4.4695 | 0.2400 | 1.67 | 20.4 | −21.5513 |
| S4 | aspheric | 2.6184 | 0.3938 | | | −16.3750 |
| S5 | aspheric | 51.3873 | 0.5457 | 1.55 | 56.1 | 80.0000 |
| S6 | aspheric | 51.0333 | 0.3908 | | | −78.5844 |
| S7 | aspheric | −17.1586 | 0.4938 | 1.55 | 56.1 | −80.0000 |
| S8 | aspheric | −1.6600 | 0.0300 | | | −10.0249 |
| S9 | aspheric | −25.1526 | 0.3500 | 1.65 | 23.5 | 59.0226 |
| S10 | aspheric | −9.2479 | 0.0955 | | | −15.0622 |
| S11 | aspheric | −1000.0000 | 0.3300 | 1.54 | 55.7 | 79.9991 |
| S12 | aspheric | 1.338.3 | 0.4938 | | | −8.1557 |
| S13 | spherical | infinite | 0.2100 | 1.52 | 64.2 | |
| S14 | spherical | infinite | 0.3371 | | | |
| S15 | spherical | infinite | | | | |

TABLE 20

| surface number | A4 | A6 | A8 | A10 | A12 | A14 | A16 |
|---|---|---|---|---|---|---|---|
| S1 | 6.2257E−02 | 3.6433E−03 | −3.9207E−02 | 6.9202E−02 | −7.3175E−02 | 3.8996E−02 | −9.2270E−03 |
| S2 | −1.0431E−01 | 1.1914E−01 | −1.3488E−02 | −1.6137E−01 | 2.0591E−01 | −1.1034E−01 | 2.0751E−02 |
| S3 | −1.6347E−01 | 2.7819E−01 | 2.6546E−02 | −4.8052E−01 | 6.3644E−01 | −3.5393E−01 | 6.9858E−02 |
| S4 | 2.5237E−02 | 1.0710E−01 | 1.1674E−01 | −2.7619E−01 | 1.6406E−01 | 1.0455E−01 | −6.4258E−02 |
| S5 | −1.2760E−01 | −5.8859E−02 | 2.9238E−01 | −9.1038E−01 | 1.5633E+00 | −1.4408E+00 | 5.7858E−01 |
| S6 | −9.4480E−02 | −5.0371E−02 | 7.1558E−02 | −1.5425E−01 | 1.8931E−01 | −1.1365E−01 | 2.9446E−02 |
| S7 | 2.2644E−02 | 2.4000E−02 | −8.1542E−02 | 4.1214E−02 | −8.0245E−03 | −1.7695E−03 | 9.7316E−04 |
| S8 | −6.2578E−02 | 1.0086E−01 | −1.0981E−01 | 8.0821E−02 | −3.5143E−02 | 7.7808E−03 | −6.7647E−04 |
| S9 | 1.1317E−01 | −2.7333E−01 | 1.3529E−01 | −8.5639E−03 | −1.3075E−02 | 4.3429E−03 | −4.3552E−04 |
| S10 | 2.2782E−01 | −4.2278E−01 | 2.9386E−01 | −1.1618E−01 | 2.7665E−02 | −3.6397E−03 | 2.0109E−04 |
| S11 | −1.6616E−01 | 2.9247E−02 | 3.1934E−02 | −1.8220E−02 | 4.1856E−03 | −4.6540E−04 | 2.0608E−05 |
| S12 | −1.7230E−01 | 1.1619E−01 | −4.9305E−02 | 1.3031E−02 | −2.1544E−03 | 2.0398E−04 | −8.3380E−06 |

TABLE 21

| | parameter | | | | | | | |
|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.55 | −9.99 | −29771.53 | 3.33 | 22.48 | −2.49 | 3.92 | 4.75 | 3.05 |

FIG. 14A illustrates the longitudinal aberration curve of the optical imaging lens assembly according to Embodiment 7, representing deviations of focal points of light of different wavelengths converged after passing through the lens assembly. FIG. 14B illustrates the astigmatic curve of the optical imaging lens assembly according to Embodiment 7, representing a curvature of the tangential image plane and a curvature of the sagittal image plane. FIG. 14C illustrates the distortion curve of the optical imaging lens assembly according to Embodiment 7, representing amounts of distortion at different viewing angles. FIG. 14D illustrates the lateral color curve of the optical imaging lens assembly according to Embodiment 7, representing deviations of different image heights on the image plane after light passes through the lens assembly. It can be seen from FIGS. 14A-14D that the optical imaging lens assembly according to Embodiment 7 can achieve a good imaging quality.

Embodiment 8

Figure 15:
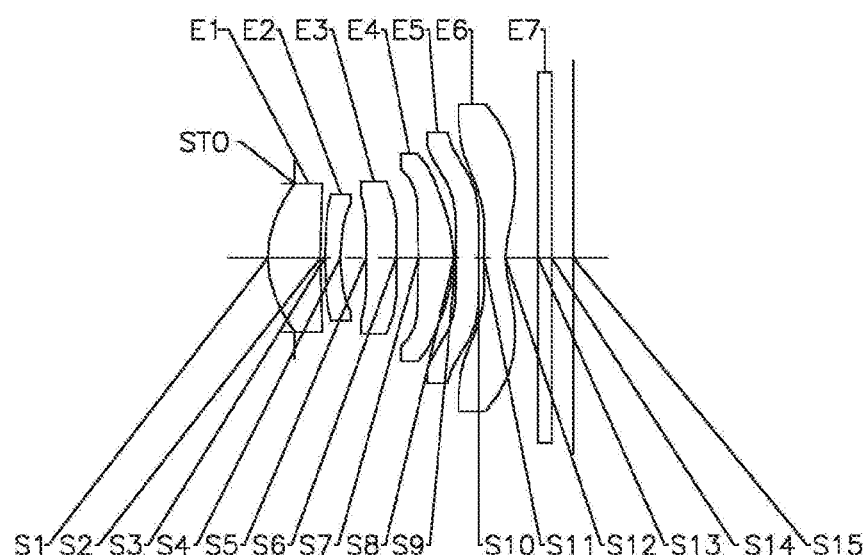
FIG. 15 is a schematic structural diagram illustrating an optical imaging lens assembly according to Embodiment 8 of the present disclosure.

An optical imaging lens assembly according to Embodiment 8 of the present disclosure is described below with reference to FIGS. 15-16D. FIG. 15 is a schematic structural diagram illustrating the optical imaging lens assembly according to Embodiment 8 of the present disclosure.

As shown in FIG. 15, the optical imaging lens assembly includes, sequentially along an optical axis from an object side to an image side, a first lens E1, a second lens E2, a third lens E3, a fourth lens E4, a fifth lens E5, a sixth lens E6, and an image plane S15. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a positive refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a positive refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm. STO for limiting light beams may be disposed between the object side and the first lens E1, to improve the imaging quality of the optical imaging lens assembly.

Table 22 shows the surface type, the radius of curvature, the thickness, the material and the conic coefficient of each lens of the optical imaging lens assembly in Embodiment 8. The radius of curvature and the thickness are both shown in millimeters (mm). Table 23 shows the high-order coefficients applicable to each aspheric surface in Embodiment 8.

The surface type of each aspheric surface may be defined by the formula (1) given in Embodiment 1. Table 24 shows the effective focal lengths f1-f6 of the lenses in Embodiment 8, the total effective focal length f of the optical imaging lens assembly, the total track length of the optical imaging lens assembly, and the half of the diagonal length ImgH of the effective pixel area on the image plane S15 of the optical imaging lens assembly.

TABLE 22

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.4117 | | | |
| S1 | aspheric | 1.6885 | 0.8188 | 1.62 | 63.5 | −2.6184 |
| S2 | aspheric | 5.5388 | 0.0687 | | | −46.6299 |
| S3 | aspheric | 4.6702 | 0.2400 | 1.67 | 20.4 | −21.7354 |
| S4 | aspheric | 2.8039 | 0.3997 | | | −15.3635 |
| S5 | aspheric | 18.2932 | 0.4687 | 1.55 | 56.1 | −5.3437 |
| S6 | aspheric | 15.0388 | 0.3468 | | | −69.8175 |
| S7 | aspheric | −12.0349 | 0.5545 | 1.55 | 56.1 | −41.1804 |
| S8 | aspheric | −1.6349 | 0.0300 | | | −8.7265 |
| S9 | aspheric | −14.3403 | 0.3521 | 1.65 | 23.5 | −25.3335 |
| S10 | aspheric | −9.9998 | 0.0827 | | | −4.7520 |
| S11 | aspheric | 7.1820 | 0.3300 | 1.54 | 55.7 | −43.8503 |
| S12 | aspheric | 1.2409 | 0.5107 | | | −6.6358 |
| S13 | spherical | infinite | 0.2100 | 1.52 | 64.2 | |
| S14 | spherical | infinite | 0.3371 | | | |
| S15 | spherical | infinite | | | | |

TABLE 23

| surface number | A4 | A6 | A8 | A10 | A12 | A14 | A16 |
|---|---|---|---|---|---|---|---|
| S1 | 6.1837E−02 | −2.9733E−04 | −3.0053E−02 | 5.5907E−02 | −5.9103E−02 | 3.0432E−02 | −6.7809E−03 |
| S2 | −1.2415E−01 | 1.7790E−01 | −1.4983E−01 | 1.0919E−01 | −1.2135E−01 | 8.9936E−02 | −2.6450E−01 |
| S3 | −1.7685E−01 | 3.5182E−01 | −2.0997E−01 | 6.6223E−02 | −1.1206E−01 | 1.6445E−01 | −7.0782E−02 |
| S4 | 1.8047E−02 | 1.7774E−01 | −1.0651E−01 | 1.5061E−01 | −3.2325E−01 | 4.0698E−01 | −1.5425E−01 |
| S5 | −1.2481E−01 | −1.9806E−02 | 6.0802E−02 | −1.3055E−01 | 2.0630E−01 | −2.2318E−01 | 1.2821E−01 |
| S6 | −8.5553E−02 | −2.4181E−02 | −3.2193E−02 | 3.6590E−02 | −1.9870E−03 | −1.5447E−02 | 9.8993E−03 |
| S7 | 3.4535E−02 | −1.3846E−02 | −4.7239E−03 | −7.2329E−02 | 8.6801E−02 | 4.3572E−02 | 8.4484E−03 |
| S8 | −5.5323E−02 | 1.0516E−01 | −1.4195E−01 | 1.0406E−01 | −3.9620E−02 | 6.8561E−03 | −3.7311E−04 |
| S9 | 8.4168E−02 | −1.5180E−01 | −2.5127E−02 | 9.2761E−02 | −4.6599E−02 | 9.9491E−03 | −8.0889E−04 |
| S10 | 1.9624E−01 | −3.4144E−01 | 2.0476E−01 | −6.6321E−02 | 1.2664E−02 | −1.3195E−03 | 5.5601E−05 |
| S11 | −1.8011E−01 | 1.4125E−02 | 4.4682E−02 | −2.1922E−02 | 4.5761E−03 | −4.5554E−04 | 1.7374E−05 |
| S12 | −1.7873E−01 | 1.0995E−01 | −4.2208E−02 | 9.9545E−03 | −1.4527E−03 | 1.2120E−04 | −4.3871E−06 |

TABLE 24

| | parameter | | | | | | | | |
| | f1 (mm) | f2 (mm) | f3 (mm) | f4 (mm) | f5 (mm) | f6 (mm) | f (mm) | TTL (mm) | ImgH (mm) |
|---|---|---|---|---|---|---|---|---|---|
| numerical value | 3.61 | −11.08 | −162.97 | 3.40 | 49.64 | −2.85 | 3.91 | 4.75 | 3.05 |

Figure 16A:
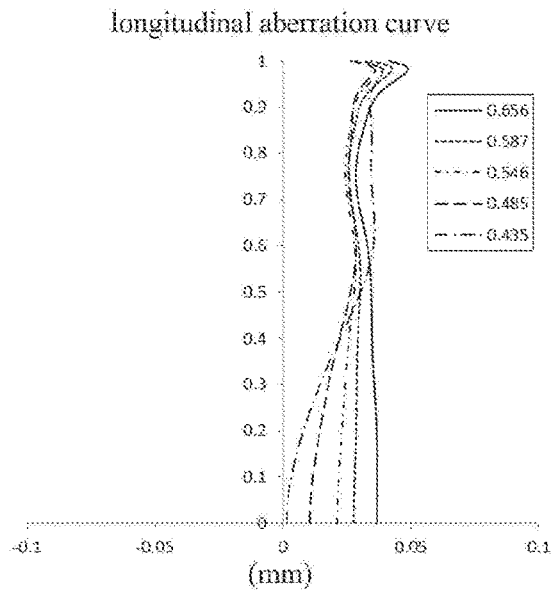
FIGS. 16A-16D respectively illustrate a longitudinal aberration curve, an astigmatic curve, a distortion curve, and a lateral color curve of the optical imaging lens assembly according to Embodiment 8.
Figure 16B:
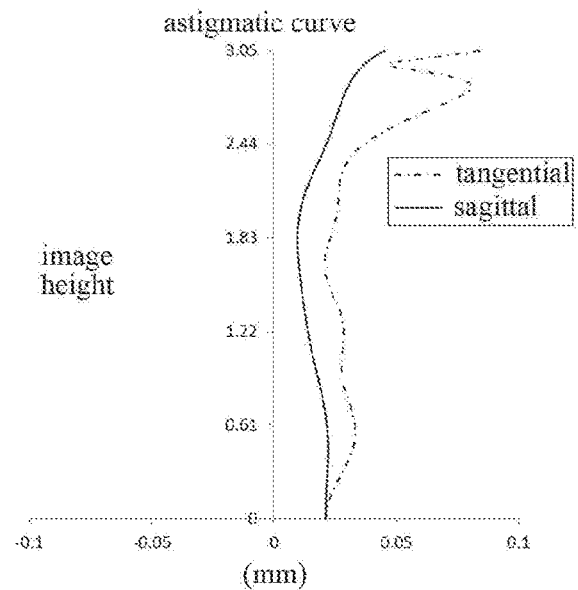
Figure 16C:
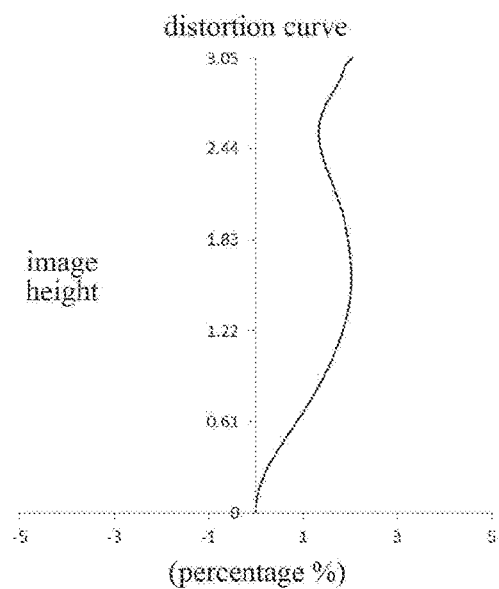
Figure 16D:
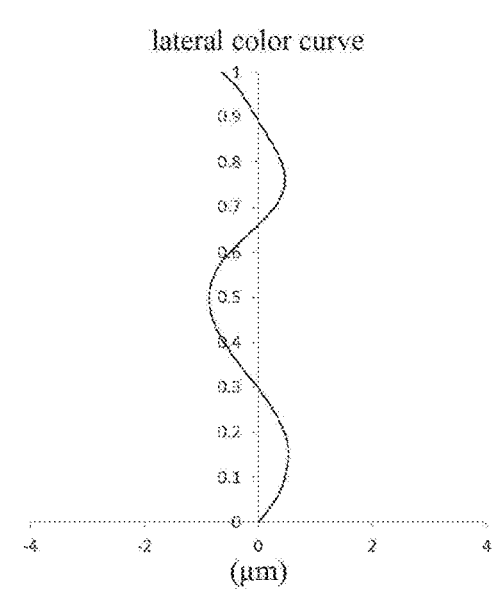

FIG. 16A illustrates the longitudinal aberration curve of the optical imaging lens assembly according to Embodiment 8, representing deviations of focal points of light of different wavelengths converged after passing through the lens assembly. FIG. 16B illustrates the astigmatic curve of the optical imaging lens assembly according to Embodiment 8, representing a curvature of the tangential image plane and a curvature of the sagittal image plane. FIG. 16C illustrates the distortion curve of the optical imaging lens assembly according to Embodiment 8, representing amounts of distortion at different viewing angles. FIG. 16D illustrates the lateral color curve of the optical imaging lens assembly according to Embodiment 8, representing deviations of different image heights on the image plane after light passes through the lens assembly. It can be seen from FIGS. 16A-16D that the optical imaging lens assembly according to Embodiment 8 can achieve a good imaging quality.

Embodiment 9

An optical imaging lens assembly according to Embodiment 9 of the present disclosure is described below with reference to FIGS. 17-18D. FIG. 17 is a schematic structural diagram illustrating the optical imaging lens assembly according to Embodiment 9 of the present disclosure.

As shown in FIG. 17, the optical imaging lens assembly includes, sequentially along an optical axis from an object side to an image side, a first lens E1, a second lens E2, a third lens E3, a fourth lens E4, a fifth lens E5, a sixth lens E6, and an image plane S15. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a positive refractive power, an object-side surface S7 of the fourth lens E4 is a concave surface, and an image-side surface S8 of the fourth lens E4 is a convex surface. The object-side surface S7 and the image side surface S8 of the fourth lens E4 are both aspheric surfaces.

The fifth lens E5 has a positive refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a convex surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the object side and the first lens E1, to improve the image quality of the optical imaging lens assembly.

Table 25 shows the surface type, the radius of curvature, the thickness, the material and the conic coefficient of each lens of the optical imaging lens assembly in Embodiment 9. The radius of curvature and the thickness are both shown in millimeters (mm). Table 26 shows the high-order coefficients applicable to each aspheric surface in Embodiment 9. The surface type of each aspheric surface may be defined by the formula (1) given in Embodiment 1. Table 27 shows the effective focal lengths f1-f6 of the lenses in Embodiment 9, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 25

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.3458 | | | |
| S1 | aspheric | 1.8333 | 0.5457 | 1.74 | 45.5 | −2.9839 |
| S2 | aspheric | 6.9467 | 0.0762 | | | −16.7356 |
| S3 | aspheric | 5.8096 | 0.2400 | 1.67 | 20.4 | −48.9304 |
| S4 | aspheric | 2.2441 | 0.4370 | | | −13.2966 |
| S5 | aspheric | 9.5092 | 0.5589 | 1.55 | 56.1 | 65.9686 |
| S6 | aspheric | −41.1238 | 0.5558 | | | −80.0000 |
| S7 | aspheric | −10.3435 | 0.4835 | 1.55 | 56.1 | −40.7286 |
| S8 | aspheric | −1.7710 | 0.0300 | | | −9.6417 |
| S9 | aspheric | −28.4596 | 0.3500 | 1.65 | 23.5 | −80.0000 |
| S10 | aspheric | −18.2018 | 0.0420 | | | −64.3454 |
| S11 | aspheric | 2.4665 | 0.3300 | 1.54 | 55.7 | −38.7425 |
| S12 | aspheric | 0.9816 | 0.5538 | | | −6.0125 |
| S13 | spherical | infinite | 0.2100 | 1.52 | 64.2 | |
| S14 | spherical | infinite | 0.3371 | | | |
| S15 | spherical | infinite | | | | |

TABLE 26

| surface number | A4 | A6 | A8 | A10 | A12 | A14 | A16 |
|---|---|---|---|---|---|---|---|
| S1 | 5.4661E−02 | 2.0126E−02 | −1.0234E−01 | 1.9923E−01 | −2.1979E−01 | 1.2442E−01 | −2.9404E−02 |
| S2 | −1.1236E−01 | 1.8584E−01 | −1.3845E−01 | −2.3930E−02 | 1.2707E−01 | −9.0198E−02 | 1.9613E−02 |
| S3 | −1.9766E−01 | 4.4557E−01 | −3.4579E−01 | −9.2077E−02 | 4.5219E−01 | −3.5421E−01 | 9.1892E−02 |
| S4 | 3.3993E−02 | 1.7743E−01 | −1.7989E−01 | 1.8027E−01 | −2.6894E−01 | 3.4322E−01 | −1.5499E−01 |
| S5 | −1.0733E−01 | 7.4068E−02 | −4.0322E−01 | 1.0092E+00 | −1.3669E+00 | 9.4378E−01 | −2.4627E−01 |

TABLE 26-continued

| surface number | A4 | A6 | A8 | A10 | A12 | A14 | A16 |
|---|---|---|---|---|---|---|---|
| S6 | −6.2493E−02 | −6.9770E−02 | 1.5363E−01 | −2.9558E−01 | 3.2357E−01 | −1.8233E−01 | 4.3273E−02 |
| S7 | 2.8019E−02 | 6.2693E−03 | −4.8186E−02 | 3.5442E−02 | −1.5537E−02 | 3.2405E−03 | −1.7281E−04 |
| S8 | −4.5520E−02 | 7.2976E−02 | −9.4583E−02 | 8.1151E−02 | −3.7846E−02 | 8.7795E−03 | −8.0679E−04 |
| S9 | 1.3842E−01 | −2.6811E−01 | 1.5291E−01 | −4.4325E−02 | 7.5135E−03 | −7.1773E−04 | 2.7922E−05 |
| S10 | 1.9802E−01 | −3.5615E−01 | 2.2605E−01 | −7.7140E−02 | 1.5180E−02 | −1.6042E−03 | 6.9694E−05 |
| S11 | −1.9383E−01 | 1.5184E−02 | 5.2852E−02 | −2.7222E−02 | 6.0493E−03 | −6.5550E−04 | 2.8332E−05 |
| S12 | −1.8885E−01 | 1.2297E−01 | −4.8187E−02 | 1.1149E−01 | −1.5087E−03 | 1.0826E−04 | −3.0459E−06 |

TABLE 27

| | parameter | | | | | | | | |
|---|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.22 | −5.63 | 14.19 | 3.83 | 77.26 | −3.29 | 3.72 | 4.75 | 2.90 |

Figure 18C:
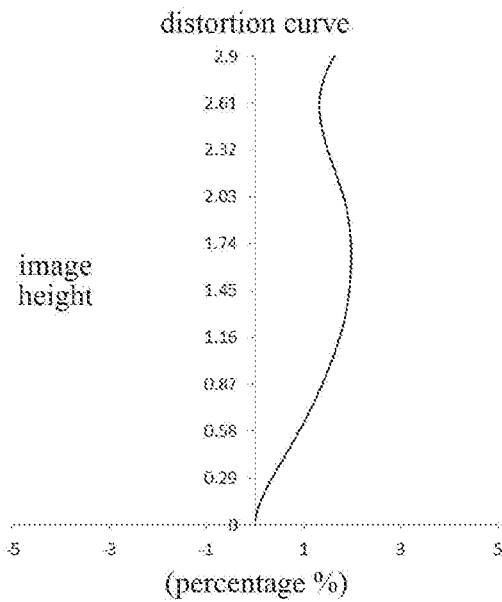
Figure 18D:
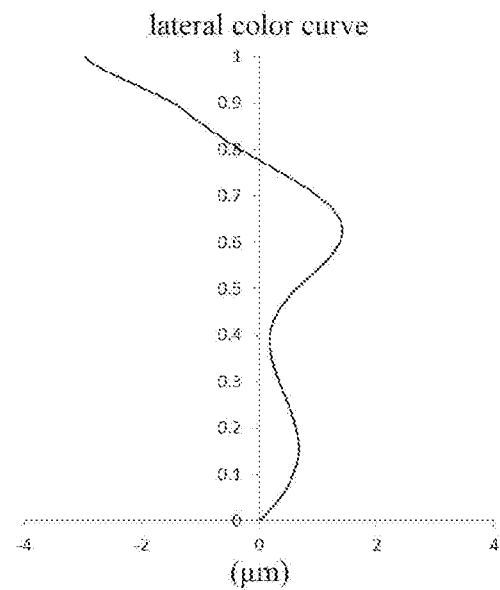

FIG. 18A illustrates the longitudinal aberration curve of the optical imaging lens assembly according to Embodiment 9, representing deviations of focal points of light of different wavelengths converged after passing through the lens assembly. FIG. 18B illustrates the astigmatic curve of the optical imaging lens assembly according to Embodiment 9, representing a curvature of the tangential image plane and a curvature of the sagittal image plane. FIG. 18C illustrates the distortion curve of the optical imaging lens assembly according to Embodiment 9, representing amounts of distortion at different viewing angles. FIG. 18D illustrates the lateral color curve of the optical imaging lens assembly according to Embodiment 9, representing deviations of different image heights on the image plane after light passes through the lens assembly. It can be seen from FIGS. 18A-18D that the optical imaging lens assembly according to Embodiment 9 can achieve a good imaging quality.

To sum up, Embodiments 1-9 respectively satisfy the relationships shown in Table 28 below.

TABLE 28

| Conditional Expression | Embodiment | | | | | | | | |
|---|---|---|---|---|---|---|---|---|---|
| | 1 | 2 | 3 | 4 | 5 | 6 | 7 | 8 | 9 |
| f/EPD | 1.68 | 1.68 | 1.70 | 1.69 | 1.70 | 1.69 | 1.78 | 1.69 | 1.68 |
| f/|R9| | 0.11 | 0.07 | 0.10 | 0.00 | 0.27 | 0.15 | 0.16 | 0.27 | 0.13 |
| f/|R10| | 0.24 | 0.18 | 0.15 | 0.08 | 0.26 | 0.28 | 0.42 | 0.39 | 0.20 |
| TTL/ImgH | 1.56 | 1.56 | 1.56 | 1.56 | 1.56 | 1.56 | 1.56 | 1.56 | 1.64 |
| f1/f2 | −0.32 | −0.32 | −0.50 | −0.37 | −0.32 | −0.33 | −0.36 | −0.33 | −0.57 |
| f/f1 | 1.07 | 1.06 | 1.34 | 1.11 | 1.08 | 1.05 | 1.10 | 1.08 | 1.16 |
| CT1/CT2 | 3.09 | 2.98 | 3.40 | 3.24 | 3.38 | 2.96 | 3.13 | 3.41 | 2.27 |
| f/R12 | 3.21 | 3.25 | 2.93 | 3.09 | 3.14 | 3.13 | 2.93 | 3.15 | 3.79 |
| f/R1 | 2.30 | 2.31 | 2.14 | 2.30 | 2.31 | 2.31 | 2.34 | 2.31 | 2.03 |
| f4/f | 0.91 | 0.92 | 1.04 | 0.94 | 0.84 | 0.86 | 0.85 | 0.87 | 1.03 |
| V1/V2 | 3.14 | 3.14 | 3.14 | 2.96 | 3.14 | 3.14 | 3.14 | 3.11 | 2.23 |
| β62 (°) | 10.7 | 10.5 | 10.3 | 10.4 | 11.0 | 9.0 | 8.3 | 9.8 | 10.4 |

The present disclosure further provides an imaging device having a photosensitive element which may be a photosensitive charge-coupled device element (CCD) or complementary metal-oxide semiconductor (CMOS) element. The imaging device may be an independent imaging device such as a digital camera, or may be an imaging module integrated in a mobile electronic device such as a mobile phone. The imaging device is equipped with the imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed is the present disclosure with (but not limited to) technical features with similar functions.

What is claimed is:

1. An optical imaging lens assembly comprising, sequentially along an optical axis from an object side to an image side, a first lens, a second lens, a third lens, a fourth lens, a fifth lens, and a sixth lens,
    wherein the first lens has a positive refractive power;
    each of the second lens, the third lens, and the sixth lens has a negative refractive power;
    at least one of the fourth lens or the fifth lens has a positive refractive power;
    an object-side surface of the first lens and an image-side surface of the fourth lens are convex surfaces; and
    an image-side surface of the second lens and an image-side surface of the sixth lens are concave surfaces;
    wherein a total effective focal length f of the optical imaging lens assembly and a radius of curvature R9 of an object-side surface of the fifth lens satisfy: f/|R9|≤0.35, and
    wherein the total effective focal length f of the optical imaging lens assembly and an entrance pupil diameter EPD of the optical imaging lens assembly satisfy: f/EPD≤1.8.

2. The optical imaging lens assembly according to claim 1, wherein an effective focal length f1 of the first lens and an effective focal length f2 of the second lens satisfy: −1<f1/f2<0.

3. An optical imaging lens assembly comprising, sequentially along an optical axis from an object side to an image side, a first lens, a second lens, a third lens, a fourth lens, a fifth lens, and a sixth lens,
    wherein the first lens has a positive refractive power, and an object-side surface of the first lens is a convex surface;
    the second lens has a negative refractive power, and an image-side surface of the second lens is a concave surface;
    the third lens has a positive refractive power or a negative refractive power;
    the fourth lens has a positive refractive power, and an image-side surface of the fourth lens is a convex surface;
    the fifth lens has a positive refractive power or a negative refractive power, an object-side surface of the fifth lens is a concave surface, and an image-side surface of the fifth lens is a convex surface; and
    the sixth lens has a negative refractive power, and an image-side surface of the sixth lens is a concave surface;
    wherein a total effective focal length f of the optical imaging lens assembly and a radius of curvature R10 of the image-side surface of the fifth lens satisfy: f/|R10|≤0.5, and
    wherein the total effective focal length f of the optical imaging lens assembly and an entrance pupil diameter EPD of the optical imaging lens assembly satisfy: f/EPD≤1.8.

4. The optical imaging lens assembly according to claim 1, wherein the total effective focal length f of the optical imaging lens assembly and an effective focal length f1 of the first lens satisfy: 1<f/f1<1.5.

5. The optical imaging lens assembly according to claim 1, wherein a center thickness CT1 of the first lens on the optical axis and a center thickness CT2 of the second lens on the optical axis satisfy: 2.0<CT1/CT2<3.5.

6. The optical imaging lens assembly according to claim 1, wherein the total effective focal length f of the optical imaging lens assembly and a radius of curvature R12 of the image-side surface of the sixth lens satisfy: 2.5<f/R12<4.0.

7. The optical imaging lens assembly according to claim 1, wherein the total effective focal length f of the optical imaging lens assembly and a radius of curvature R1 of the object-side surface of the first lens satisfy: 2≤f/R1<2.5.

8. The optical imaging lens assembly according to claim 1, wherein the fourth lens has a positive refractive power, and an effective focal length f4 of the fourth lens and the total effective focal length f of the optical imaging lens assembly satisfy: 0.7<f4/f<1.2.

9. The optical imaging lens assembly according to claim 1, wherein an abbe number V1 of the first lens and an abbe number V2 of the second lens satisfy: 2.0<V1/V2<4.0.

10. The optical imaging lens assembly according to claim 1, wherein an incident angle β62 of an upper ray of a maximal field of view entering on the image-side surface of the sixth lens satisfies: 7°<β62<12°.

11. The optical imaging lens assembly according to claim 3, wherein the total effective focal length f of the optical imaging lens assembly and an effective focal length f1 of the first lens satisfy: 1<f/f1<1.5.

12. The optical imaging lens assembly according to claim 11, wherein the effective focal length f1 of the first lens and an effective focal length f2 of the second lens satisfy: −1<f1/f2<0.

13. The optical imaging lens assembly according to claim 12, wherein an abbe number V1 of the first lens and an abbe number V2 of the second lens satisfy: 2.0<V1/V2<4.0.

14. The optical imaging lens assembly according to claim 13, wherein a center thickness CT1 of the first lens on the optical axis and a center thickness CT2 of the second lens on the optical axis satisfy: 2.0<CT1/CT2<3.5.

15. The optical imaging lens assembly according to claim 3, wherein an effective focal length f4 of the fourth lens and the total effective focal length f of the optical imaging lens assembly satisfy: 0.7<f4/f<1.2.

16. The optical imaging lens assembly according to claim 3, wherein the total effective focal length f of the optical imaging lens assembly and a radius of curvature R1 of the object-side surface of the first lens satisfy: 2≤f/R1<2.5.

17. The optical imaging lens assembly according to claim 3, wherein the total effective focal length f of the optical imaging lens assembly and a radius of curvature R12 of the image-side surface of the sixth lens satisfy: 2.5<f/R12<4.0.

18. The optical imaging lens assembly according to claim 17, wherein an incident angle $\beta 62$ of an upper ray of a maximal field of view entering on the image-side surface of the sixth lens satisfies: $7° < \beta 62 < 12°$.

* * * * *